(12) United States Patent
Simon et al.

(10) Patent No.: US 8,046,275 B2
(45) Date of Patent: Oct. 25, 2011

(54) SYNCHRONIZING AN ALLOCATION TABLE WITH A PROCUREMENT SYSTEM

(75) Inventors: Berthold Simon, Kirkel-Limbach (DE); Thomas Gabelmann, Kirkel (DE)

(73) Assignee: SAP Aktiengesellschaft, Walldorf (DE)

( * ) Notice: Subject to any disclaimer, the term of this patent is extended or adjusted under 35 U.S.C. 154(b) by 1141 days.

(21) Appl. No.: 11/028,480

(22) Filed: Jan. 3, 2005

(65) Prior Publication Data

US 2005/0243792 A1 Nov. 3, 2005

Related U.S. Application Data

(60) Provisional application No. 60/563,284, filed on Apr. 16, 2004.

(51) Int. Cl.
*G06Q 10/00* (2006.01)
*G06F 17/60* (2006.01)

(52) U.S. Cl. ............................................ 705/28; 705/10

(58) Field of Classification Search ...................... 705/28
See application file for complete search history.

(56) References Cited

U.S. PATENT DOCUMENTS

| | | | |
|---|---|---|---|
| 5,400,253 A | 3/1995 | O'Connor | |
| 5,930,771 A | 7/1999 | Stapp | |
| 5,999,914 A | 12/1999 | Blinn et al. | |
| 6,029,139 A | 2/2000 | Cunningham et al. | |
| 6,078,900 A * | 6/2000 | Ettl et al. ........................ | 705/28 |
| 6,507,851 B1 | 1/2003 | Fujiwara et al. | |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,092,929 B1 | 8/2006 | Dvorak et al. | |
| 7,117,165 B1 | 10/2006 | Adams et al. | |
| 7,139,731 B1 | 11/2006 | Alvin | |
| 7,308,416 B2 * | 12/2007 | Peachey-Kountz et al. ...... | 705/8 |
| 7,580,766 B1 * | 8/2009 | Sharma et al. ................ | 700/100 |
| 7,657,534 B2 * | 2/2010 | Kirkegaard .................... | 707/781 |
| 2001/0039517 A1 | 11/2001 | Kawakatsu | |
| 2002/0023500 A1 | 2/2002 | Chikuan et al. | |
| 2002/0026368 A1 | 2/2002 | Carter | |
| 2002/0059108 A1 | 5/2002 | Okura et al. | |
| 2002/0078159 A1 * | 6/2002 | Petrogiannis et al. ......... | 709/206 |
| 2002/0107713 A1 | 8/2002 | Hawkins | |

(Continued)

FOREIGN PATENT DOCUMENTS

JP 2004-30343 A 1/2004

OTHER PUBLICATIONS

Cincinnati Business Courier, Local tech firm creates retail markdown tool Mar. 27, 2000, 3 pages.*

(Continued)

*Primary Examiner* — Garcia Ade
(74) *Attorney, Agent, or Firm* — Foley & Lardner LLP

(57) ABSTRACT

A system and method for synchronizing an allocation table with a purchase order in a computerized system. The method comprises generating a purchase order having purchase order data, and using the purchase order data in the purchase order to generate an allocation table having allocation table data. The method further comprises detecting a change in at least one of the purchase order data and the allocation table data, and automatically updating the other of the purchase data and the allocation table data to reflect the change.

27 Claims, 20 Drawing Sheets

U.S. PATENT DOCUMENTS

| | | | |
|---|---|---|---|
| 2002/0123930 A1 | 9/2002 | Boyd et al. | |
| 2002/0147668 A1 | 10/2002 | Smith et al. | |
| 2002/0184116 A1 | 12/2002 | Tam et al. | |
| 2003/0023500 A1 | 1/2003 | Boies et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0158791 A1 | 8/2003 | Gilberto et al. | |
| 2003/0172007 A1 | 9/2003 | Helmolt et al. | |
| 2003/0200158 A1* | 10/2003 | Feldman et al. | 705/28 |
| 2003/0212617 A1* | 11/2003 | Stone et al. | 705/30 |
| 2003/0229502 A1 | 12/2003 | Woo | |
| 2004/0098358 A1 | 5/2004 | Roediger | |
| 2004/0162763 A1 | 8/2004 | Hoskin et al. | |
| 2004/0186783 A1 | 9/2004 | Knight et al. | |
| 2004/0186794 A1* | 9/2004 | Renz et al. | 705/28 |
| 2004/0210489 A1* | 10/2004 | Jackson et al. | 705/22 |
| 2004/0220861 A1 | 11/2004 | Morciniec et al. | |
| 2004/0254842 A1* | 12/2004 | Kirkegaard | 705/22 |
| 2004/0267674 A1 | 12/2004 | Feng et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0216359 A1* | 9/2005 | Welter et al. | 705/26 |
| 2005/0235020 A1* | 10/2005 | Gabelmann et al. | 707/205 |
| 2005/0246482 A1* | 11/2005 | Gabelmann et al. | 711/111 |
| 2005/0251734 A1* | 11/2005 | Gabelmann et al. | 715/503 |
| 2005/0261954 A1* | 11/2005 | Aoyama et al. | 705/10 |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2006/0229953 A1* | 10/2006 | Walker et al. | 705/26 |

OTHER PUBLICATIONS

"Simple way to find quantities subject to an aggregate restraint". Edward A. Silver. Production and Inventory Management Journal. Alexandria: First Quarter 2002. vol. 43, Iss. 1/2; p. 9. Retrieved via ProQuest on Nov. 9, 2009.

US Notice of Allowance dated Nov. 10, 2010 from related U.S. Appl. No. 11/028,483.

US Notice of Allowance for U.S. Appl. No. 11/047,382 dated Nov. 13, 2009.

Office Action for U.S. Appl. No. 11/028,483, mail date Oct. 6, 2008, 8 pages.

Office Action for U.S. Appl. No. 11/028,483, mail date Mar. 11, 2010, 11 pages.

Office Action for U.S. Appl. No. 11/028,483, mail date Jun. 17, 2009, 12 pages.

Office Action for U.S. Appl. No. 11/047,382, mail date Feb. 15, 2007, 8 pages.

Office Action for U.S. Appl. No. 11/047,382, mail date Mar. 19, 2009, 12 pages.

Office Action for U.S. Appl. No. 11/047,382, mail date Jun. 9, 2008, 8 pages.

Office Action for U.S. Appl. No. 11/047,382, mail date Sep. 10, 2007, 8 pages.

Office Action for U.S. Appl. No. 11/047,382, mail date Sep. 18, 2008, 11 pages.

Office Action for U.S. Appl. No. 11/047,382, mail date Sep. 5, 2006, 7 pages.

U.S. Appl. No. 60/374,892, filed Apr. 22, 2002, Krajec.

Abraham et al., "An Implemented System for Improving Promotion Productivity Using Store Scanner Data", Marketing Science, Summer 1993, vol. 12, No. 3, pp. 248-269.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

"Beyond Markdown Management", summer/autumn 03, the 4caster, Issue 4, vol. 2, 4 pages.

Kelkar et al., Price Modeling in Standards for Electronic Product Catalogs Based on XML, 2002, pp. 366-375.

"Retailers Manage Markdown Challenges Using i2 Solutions", Jan. 13, 2003, NRF 92nd Annual Convention & Expo, 2 pages.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

* cited by examiner

FIGURE 2

| Betrieb | Planmenge | Wunschmenge | Bestellmenge | BestätigteMenge | ME | Verteilzentr. | Bestand/freiverw. | RiS-Daten | Lieferant |
|---|---|---|---|---|---|---|---|---|---|
| 0001 | | 4 | 0 | 4 | 4 KAR | VZ01 | | 0 | |
| 0002 | | 4 | 0 | 4 | 4 KAR | VZ01 | | 0 | |
| 0003 | | 4 | 0 | 4 | 4 KAR | VZ01 | | 0 | |
| 0004 | | 4 | 0 | 4 | 4 KAR | VZ01 | | 0 | |
| 0005 | | 4 | 0 | 4 | 4 KAR | VZ01 | | 0 | |
| 0006 | | 5 | 0 | 5 | 5 KAR | VZ01 | | 0 | |
| 0101 | | 5 | 0 | 5 | 5 KAR | VZ01 | | 0 | |
| 0102 | | 5 | 0 | 5 | 5 KAR | VZ01 | | 0 | |
| 0103 | | 5 | 0 | 5 | 5 KAR | VZ01 | | 0 | |
| 0104 | | 5 | 0 | 5 | 5 KAR | VZ01 | | 0 | |
| 0105 | | 5 | 0 | 5 | 5 KAR | VZ01 | | 0 | |
| 0106 | | 5 | 0 | 5 | 5 KAR | VZ01 | | 0 | |

| Recipient/Article Variant | Total | 36 / Red | 38 / Red | 36 / Green |
|---|---|---|---|---|
| Store 1 | 45 | 10 | 20 | 15 |
| Store 2 | 50 | 15 | 25 | 10 |
| Store 3 | 60 | 20 | 20 | 20 |
| Total | 155 | 45 | 65 | 45 |

SYNCHRONIZING AN ALLOCATION TABLE WITH A PROCUREMENT SYSTEM

CROSS-REFERENCE TO RELATED PATENT APPLICATIONS

This application claims the benefit of U.S. Provisional Application No. 60/563,284, filed Apr. 16, 2004 and entitled "Inventory Management," which is hereby incorporated by reference.

FIELD OF THE INVENTION

The present invention relates generally to the field of merchandise planning, and more specifically to the use of systems and methods for facilitating assortment planning decisions.

BACKGROUND OF THE INVENTION

Businesses have become increasingly complex as the global marketplace has expanded. As such, many businesses now encompass large, often unwieldy, infrastructures. In addition to the physical expansion of businesses, many have greatly expanded the breadth of merchandise offered. Many businesses, such as retail stores, offer a wide variety of merchandise, for example clothing, sporting goods, and home furnishings. Furthermore, the depth of the merchandise offered has also expanded in an attempt to attract and maintain a large customer base. For instance, businesses often carry many variants, such as size or color, of the same article of clothing. This is particularly true in certain businesses such as retail fashion sales where clothing is available in a plethora of variations. This combination of a large infrastructure and a vast array of merchandise creates great difficulty in ensuring the proper flow of merchandise through the business.

Maintaining the proper allocation of merchandise is critical in a marketplace where customer loyalty is often fleeting. Customers desire both depth and breadth in merchandise to provide them with a multitude of purchasing choices. In addition, the allocation of merchandise to a store location can impact the overall layout of the store and thus, the presentation made to the customer. Furthermore, allocation is one of the manners in which a business can proactively manage inventories to maximize profitability. Clearly, the importance of an allocation scheme in a modern retail business is relatively high.

Obviously goods are not allocated in a vacuum. In fact, in many business models, the allocation system is intricately interwoven with the other various aspects of the business to form one integrated network of systems. One system with which allocation is often associated is procurement. The procurement system is the portion of the business model which provides the goods, for example, by obtaining supplies from vendors.

With the increasing significance of streamlined allocation and flexibility in business management, a need has developed for a business model wherein the allocation system and the procurement system are able to synchronize to more effectively integrate the allocation system into the procurement system. Thus, there is a need for a business model that provides for an allocation system which is capable of synchronizing with a procurement system to provide for increased functionality and a more efficient operation.

SUMMARY OF THE INVENTION

The present invention relates to systems and methods for synchronizing allocation systems with procurement systems. The systems and methods of the present invention facilitate the synchronization of the allocation system with the procurement system.

An exemplary embodiment relates to a method for synchronizing an allocation table with a purchase order in a computerized system. The method comprises generating a purchase order having purchase order data, and using the purchase order data in the purchase order to generate an allocation table having allocation table data. The method further comprises detecting a change in at least one of the purchase order data and the allocation table data, and automatically updating the other of the purchase data and the allocation table data to reflect the change.

Another exemplary embodiment of the invention relates to system for synchronizing an allocation table with a purchase order. The system comprises a central processing unit (CPU), and a storage device coupled to the CPU. The CPU has information stored therein for configuring the CPU to generate a purchase order having purchase order data, and use the purchase order data in the purchase order to generate an allocation table having allocation table data. The storage device further has information stored therein for configuring the CPU to detect a change in at least one of the purchase order data and the allocation table data, and automatically update the other of the purchase data and the allocation table data to reflect the change.

Yet another exemplary embodiment relates to a program product for synchronizing an allocation table with a purchase order in a computerized system. The program product comprises machine readable program code for causing, when executed, one or more machines to perform steps. The steps include generating a purchase order having purchase order data, and using the purchase order data in the purchase order to generate an allocation table having allocation table data. The steps further include detecting a change in at least one of the purchase order data and the allocation table data, and automatically updating the other of the purchase data and the allocation table data to reflect the change.

Other features and advantages of the present invention will become apparent to those skilled in the art from the following detailed description and accompanying figures. It should be understood, however, that the detailed description and specific examples, including figures, while indicating preferred embodiments of the present invention, are given by way of illustration and not limitation. Many modifications and changes within the scope of the present invention may be made without departing from the spirit thereof and the invention includes all such modifications.

BRIEF DESCRIPTION OF THE DRAWINGS

FIG. 2 illustrates one exemplary embodiment of an allocation table of the present invention.

FIG. 3 illustrates one exemplary embodiment of allocation table item data for an allocation table item of FIG. 2.

FIG. 7 illustrates one exemplary embodiment of the generation of follow-on documents.

FIG. 8 illustrates one exemplary embodiment of a recipient matrix for an allocation system of the present invention.

FIG. 12 illustrates an exemplary embodiment of the first level display of the allocation table list.

DETAILED DESCRIPTION OF EXEMPLARY EMBODIMENTS

In the following description, for the purposes of explanation, numerous details are set forth in order to provide a thorough understanding of the present invention. It would be evident to one skilled in the art, however, that the exemplary embodiments may be practiced without these specific details. In other instances, structures, devices, or steps are shown in diagram form in order to facilitate description of the exemplary embodiments. Furthermore, while the embodiments described herein refer primarily to retail products or retail sales articles, it is envisioned that the present description will be applicable to the sale of any type of product or service.

The present invention relates to an allocation system for a business model. The business model, for example a fashion planning system for a retail store, may be executed using computer readable code. The business model may be accomplished via a single system, a distributed system, or any combination thereof. The allocation system is used to plan, assign, and distribute goods to the various recipients such as individual store locations or customers.

Figure 1:
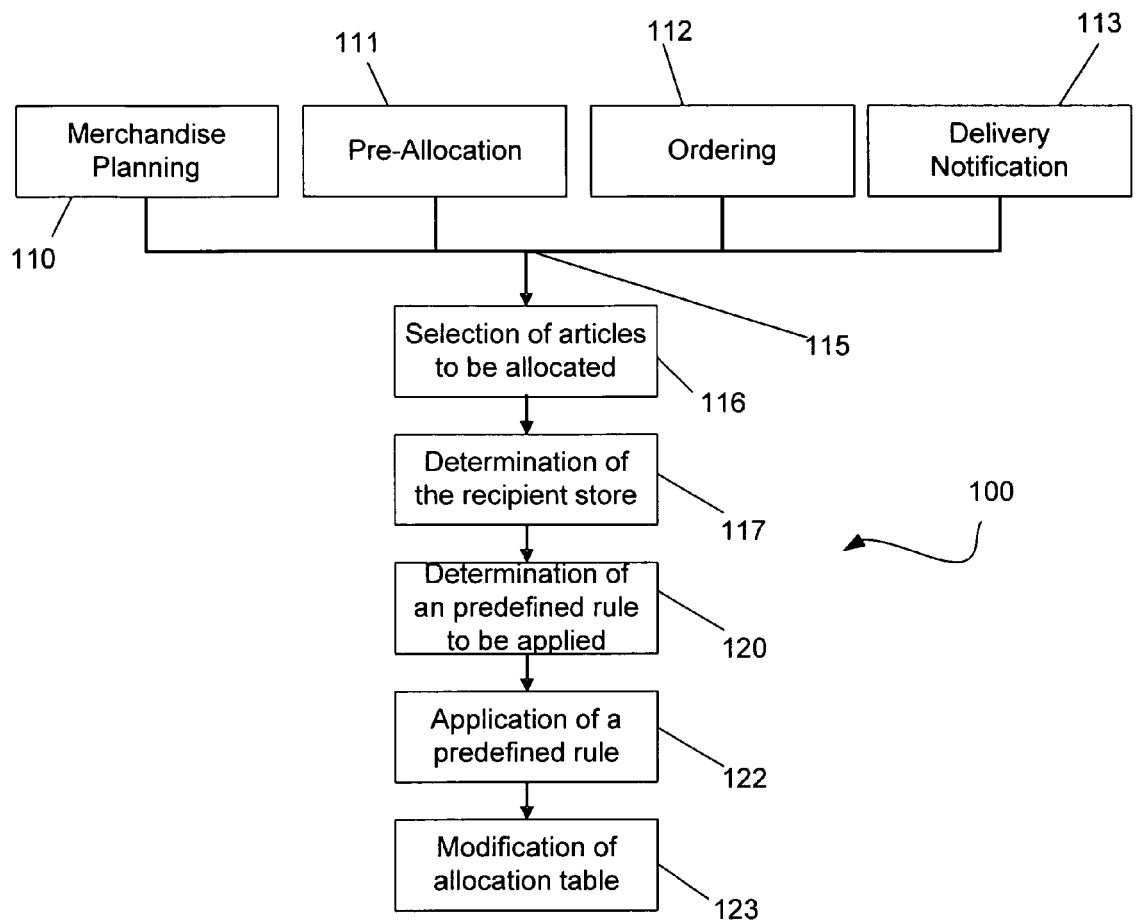
FIG. 1 illustrates one exemplary embodiment of an allocation system of the present invention.

FIG. 1 illustrates an exemplary allocation system 100. A merchandise planning step 110, a pre-allocation step 111, an ordering step 112, and a delivery notification step 113 are all accomplished at a first level 115. The articles or goods are selected at step 116 to be allocated. Alternatively, the articles or goods could be services. The store (recipient) is then determined at a step 117. Information from the business type definition is utilized at a step 118 to determine which stores will have goods allocated to them. A predefined rule such as an allocation rule or an allocation strategy is then determined at a step 120. When a particular good is constantly divided up among certain stores or store groups of a business in the same relative proportions, these proportions can be captured in an allocation rule. Actual or forecasted data can be used at a step 121 to determine the allocation rules. The allocation rules can be expressed as proportions in the form of ratios, percentages, fixed quantities, or combinations thereof. The allocation rule, or rules, determined are then applied at a step 122 as an allocation proposal in the form of an allocation table. Modification of the allocation table (such as synchronization of the allocation table with the associated purchase order, or orders) may be performed at a step 123.

The system and methods of the present invention, in one embodiment, use predetermined rules to allocate at least a portion of goods. The predetermined rules may include but are not limited to allocation rules, equal allocation of quantities, and allocation strategies (discussed below in further detail). In addition, manual entry of site quantities may be used in place of or with predetermined rules. In one embodiment, a specific store is assigned a fixed amount of an article, such as all stores receive the same initial allocation. Then an additional variable quantity is allocation depending on the application of the predetermined rules. In one embodiment, allocation rules are used. Allocation rules serve the following purposes:

Multiple use when generating allocation tables
Breakdown of the plants into categories (for example, fast-seller/slow-seller analysis)
Identification of the quantity ratio with reference to a data warehouse (for example, turnover for the previous month)

Figure 2:
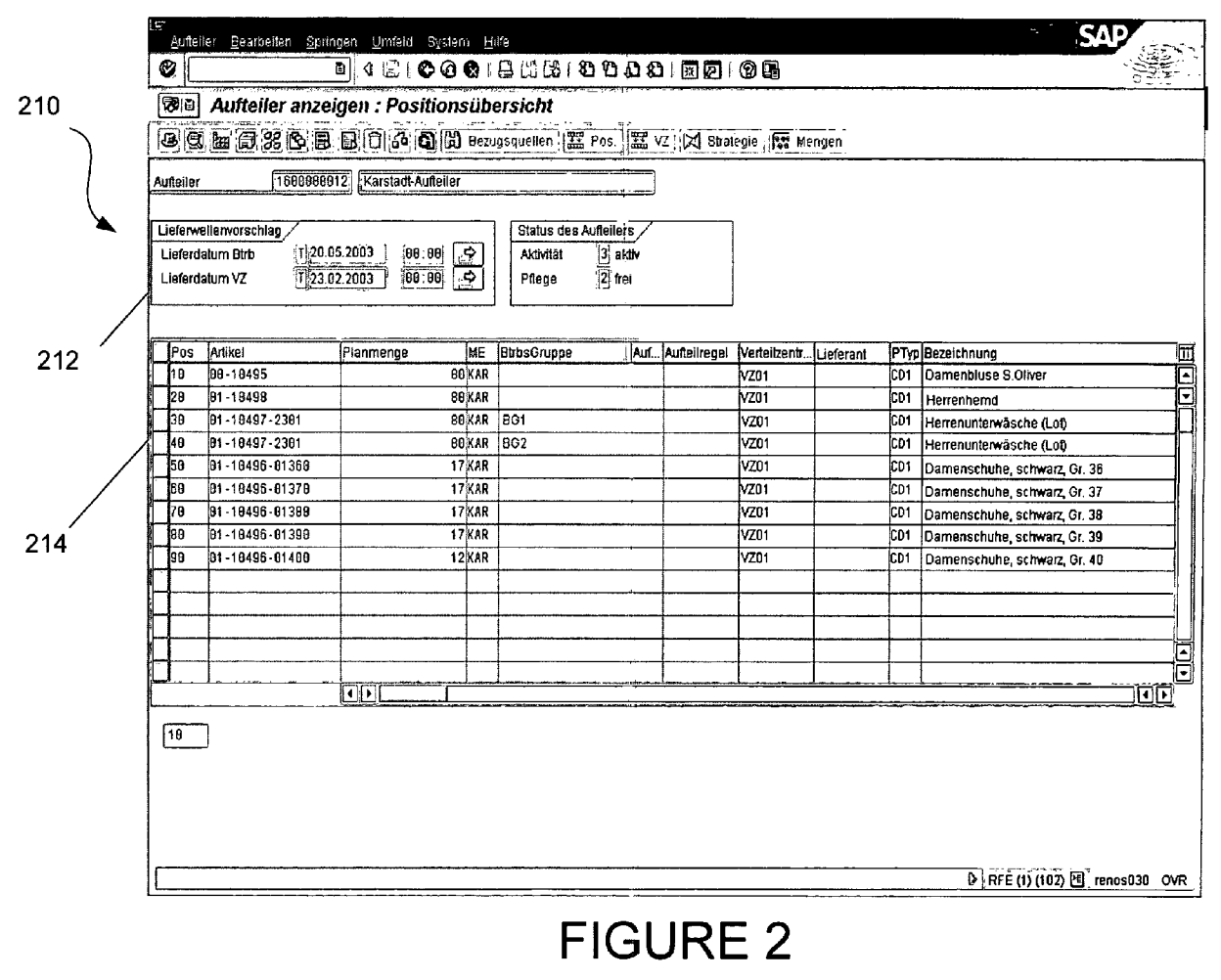

In one exemplary embodiment, the allocation system includes an allocation table. The allocation table is a planning tool used to allocate inventories of a particular stock or items among stores at specific periods. The allocation table application allows a user to plan, trigger, and monitor goods supplied to recipients (for example, stores or customers). Thus, allocation tables are primarily used to distribute services, goods or articles (referred to as allocation table items) to recipients. The allocation table consists of items in which the total quantity of items to be allocated is defined. FIG. 2 illustrates a graphical user interface 210 for displaying and revising items in an allocation table in accordance with an embodiment of the present invention. The graphical user interface 210 includes a header region 212 for displaying information such as running statistics regarding allocation. The graphical user interface 210 further includes a table area 214 for the display of allocation table items. Table area 214 includes information such as item or article to allocate, allocated quantity, unit of measure, site group (which contains sites and/or customers), allocation strategy or rule (which means how to allocate), and item category (which controls the type of follow-on documents or determination of source of supply). Allocation strategies allow the user to determine ratios or quantities per site using a customer-specific allocation procedure. Allocation strategies can be used as an alternative to allocation rules, to equal distribution of quantities (when specifying a site group), or to entering quantities manually for specific sites. In addition to the allocation strategies contained in the system, an allocation strategy can also contain a user-specific allocation procedure. Thus, in one embodiment the strategies as described herein are used as a first basic step, i.e., an access to the business warehouse containing default allocation strategies. The results of the allocation strategies are used to determine ratios or quantities per article and recipient.

Figure 20:
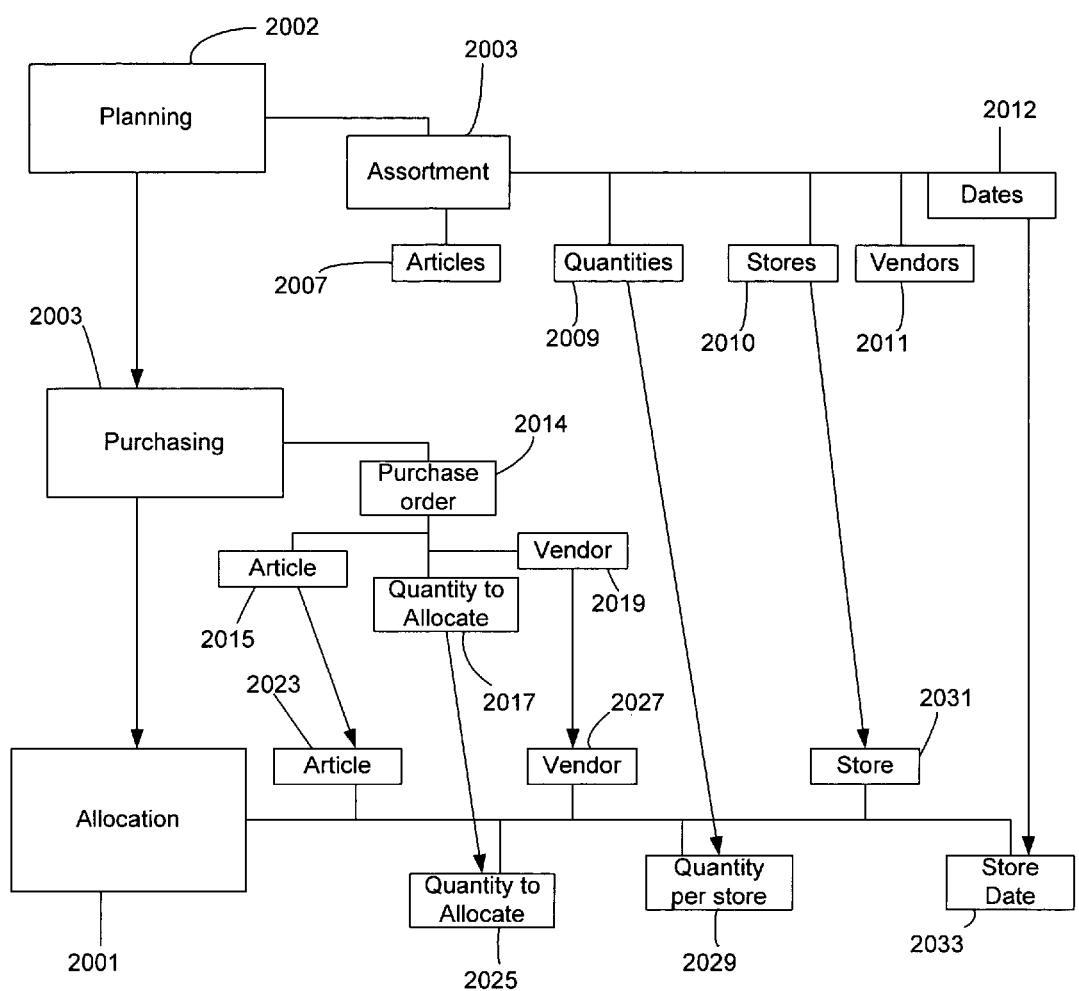
FIG. 20 illustrates, for one embodiment of an allocation table, the sources of the allocation table's data.

As illustrated in FIG. 20, the allocation system 2001 is operatively connected to the purchasing system 2002 and the planning system 2003. The planning system includes the assortment system 2005 which includes various data, for example articles and grouping 2007, quantities 2009, stores 2010, vendors 2011, and dates 2012. The purchasing system 2002 contains the purchase order 2014 for use in generating an allocation table. The purchase order 2014 may include article 2015, quantity to allocate 2017, vendor 2019, distribution center (not shown), and distribution date (not shown). The allocation system 2001 generates an allocation table using data from the planning system 2002 and the purchasing system 2003. For example, as shown in the exemplary embodiment of FIG. 20, article 2023, quantity to allocation 2025, and vendor 2027 are derived from the purchasing system 2003, while store 2029, quantity per store 2031, and store date 2033 are derived from the planning system 2002.

FIG. 3 illustrates a graphical user interface 310 for displaying and revising allocation item data for an allocation item. The graphical user interface 310 includes a header region 312 and a table area 314. Various information may be represented by the allocation item data in the table area 314, such as but not limited to, recipients of the article/item, recipient quantity, delivery date, and distribution center. In an exemplary embodiment, the quantity of an item is first divided up into the quantities planned for store groups as shown in FIG. 3. A store or site group is a grouping of stores that are managed as a single entity in planning and allocation processes. For example, in one embodiment, the members of a store group share some characteristics such as, but not limited to, being organized by common merchandise category, having similar sales volume, and changing frequently. The quantity for each store group is then divided up into the quantities planned for the individual stores. The source of supply is also determined. How an item is procured is defined at the item level. For example, items can be procured as follows: direct delivery from the vendor to recipient (third party); delivery to the distribution center and then to the recipient; and delivery from the distribution center to the recipient (allocation out of warehouse stock).

Figure 4:
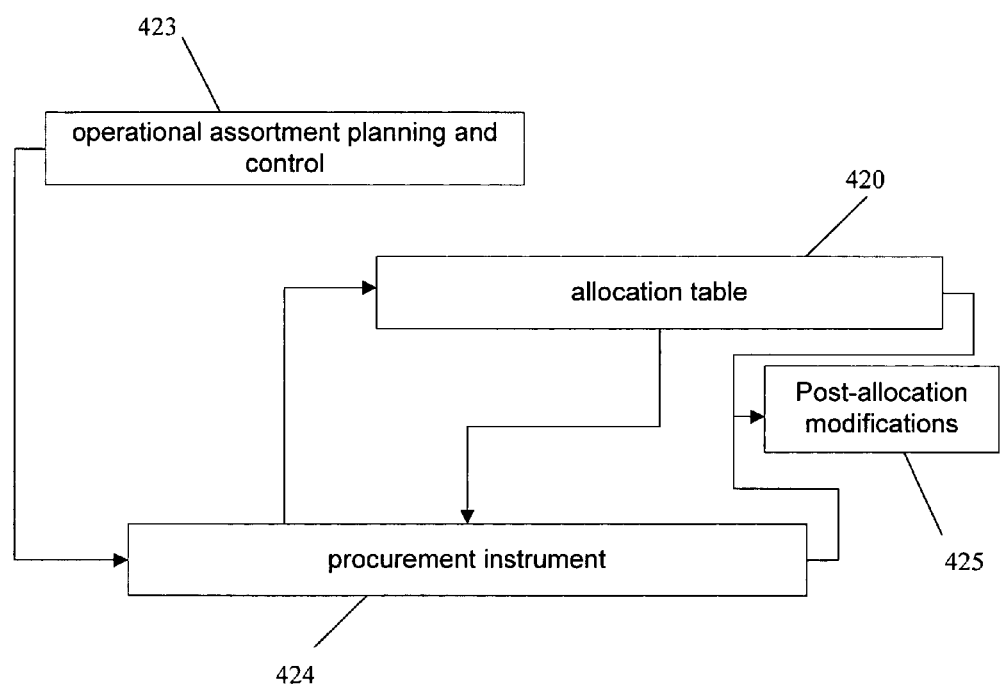
FIG. 4 illustrates one exemplary embodiment of the present invention wherein the allocation table is generated directly, following creation of an ad-hoc purchase order, or following operational assortment planning and control.

The allocation table can be generated in several ways. One possible group of scenarios for the generation of allocation tables is illustrated in FIG. 4. For example, in one exemplary embodiment, an allocation table 420 may be directly created and a purchase order generated therefrom. In another exemplary embodiment, creation of an allocation table 420 may follow the creation of and reference to an ad-hoc purchase order (i.e., a purchase order not directed by the operational assortment planning and control system). In yet another exemplary embodiment, an operational assortment planning and control system 423 may drive the creation of an allocation table 420 via a procurement instrument 424 such as, but not limited to, a price-shop report, a purchase order list, or a purchase order. This provides an allocation table with reference to the purchase order and includes allocation table data therefrom. In this context, the corresponding vendor orders must already exist in the system when the allocation table is being generated. In specific cases, the purchase order data from the generated allocation item (which comes from the purchase order) may no longer match the recipient data (which comes from operational assortment planning and control for fashion) for this item. The allocation table items generated may then be incomplete, and the recipient data of the generated allocation table items must be modified manually. Post allocation modifications 425 may also be made, such as synchronizing of the allocation table data with the associated information in the procurement system. Thus, in one embodiment, synchronization is possible from a purchase order to an allocation table, but not from an allocation table to a purchase order. In this embodiment, an allocation table can be changed when a vendor purchase order is exists, but there will be no synchronization.

Figure 5:
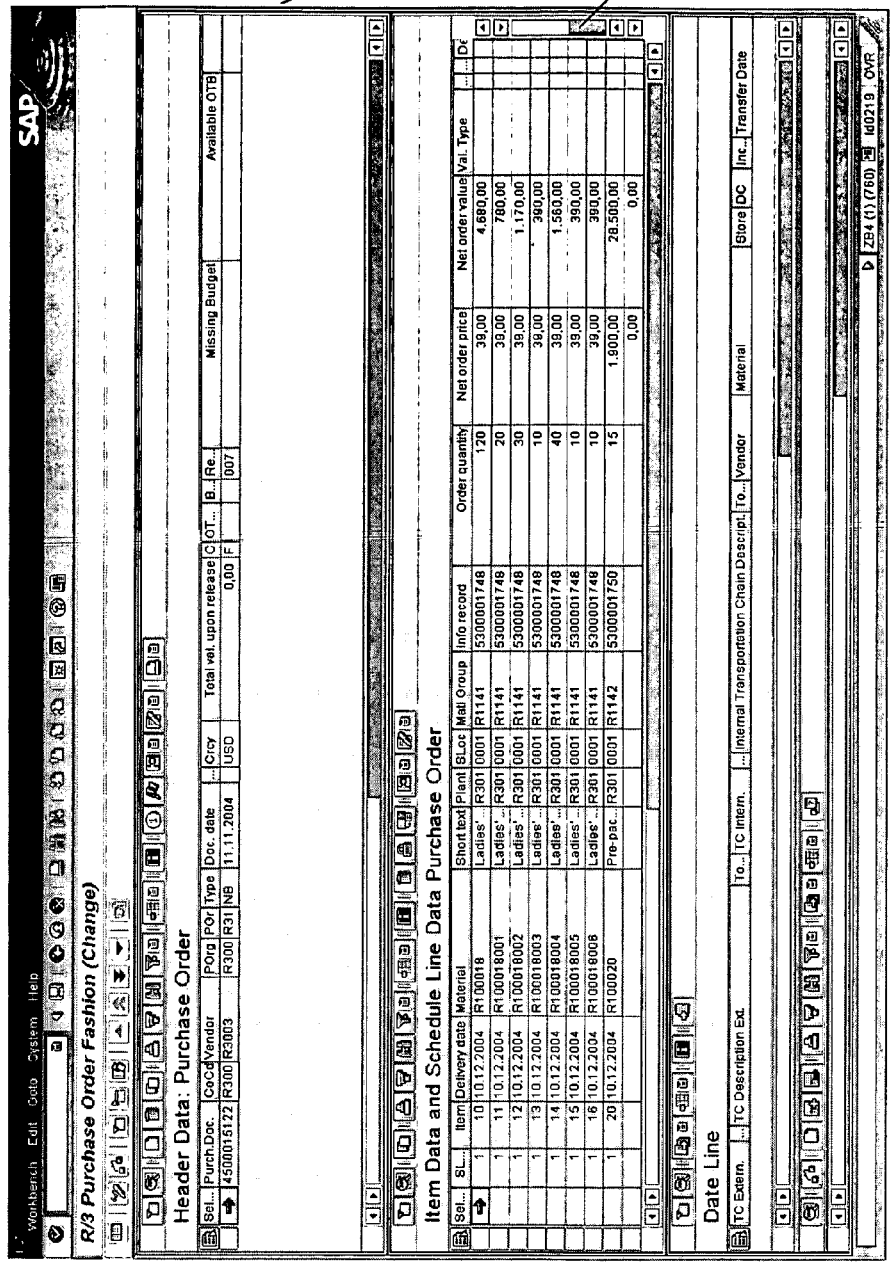
FIG. 5 illustrates one exemplary embodiment of a purchase order in accordance with the principles of the present invention.

FIG. 5 illustrates a graphical user interface 510 for displaying and editing a purchase order (not shown) in accordance with one embodiment of the present invention. The graphical user interface 510 includes a header region 512 and a table region 514. The table region 514 of the graphical user interface 510 may contain information such as, but not limited to, distribution center article or good designation, quantity, price, delivery date, or cumulative purchase order quantity. The purchase order is a request or instruction from the business to a vendor (external or internal) to deliver a certain quantity of a product or to perform certain services at a certain point in time. The purchase order contains purchase order data that corresponds to the allocation table item data of the allocation table with which the purchase order is associated.

Figure 6:
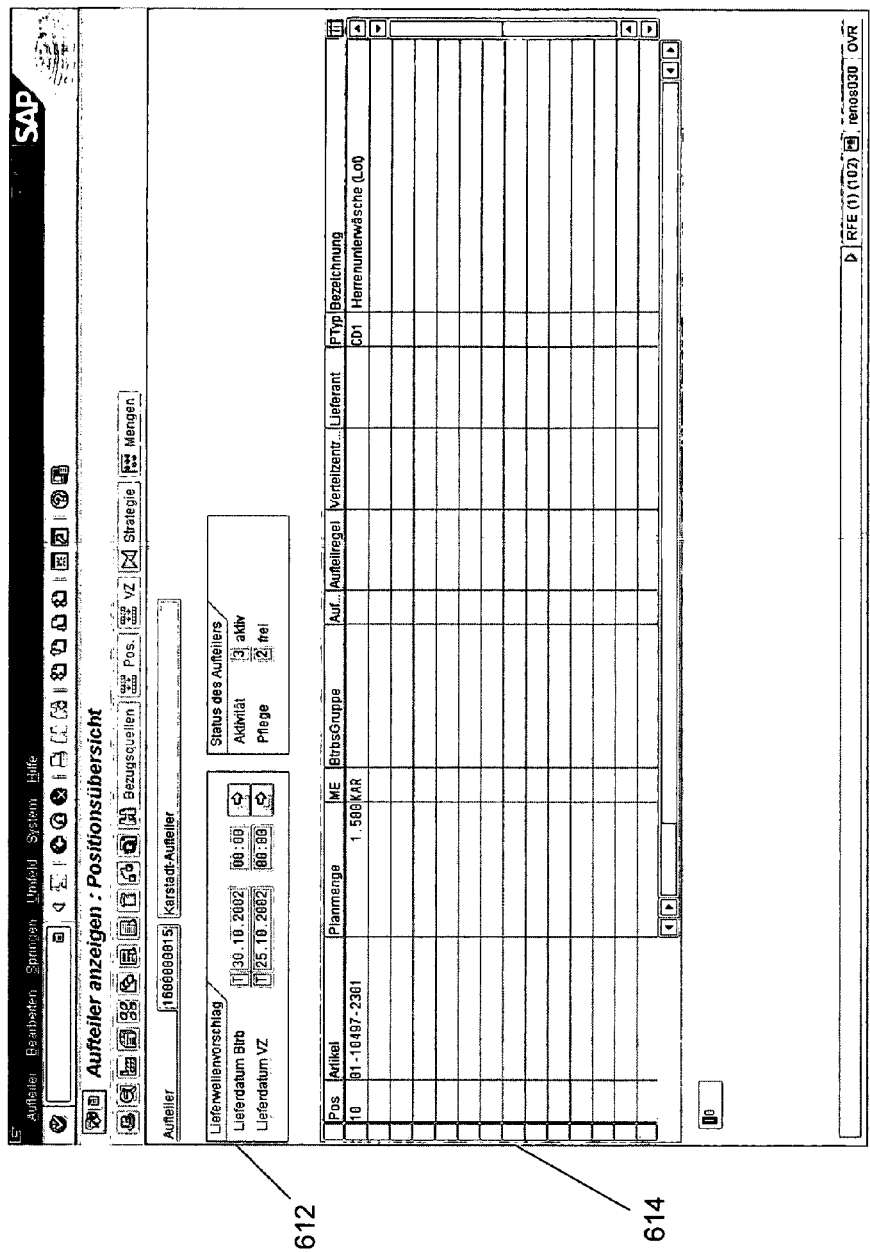
FIG. 6 illustrates one exemplary embodiment of an allocation table overview.

As shown in FIG. 6, in one embodiment an allocation table overview is provided for display on a graphical user interface 610. A header region 612 is provided with information regarding supply date and the status. A tabular region 614 is provided which displays specific information regarding the articles in the allocation table, including but not limited to article name, planned amount, allocation rule, supplier, and designation. In other exemplary embodiments, additional views based on the data in the allocation table are envisioned as discussed herein.

Figure 7:
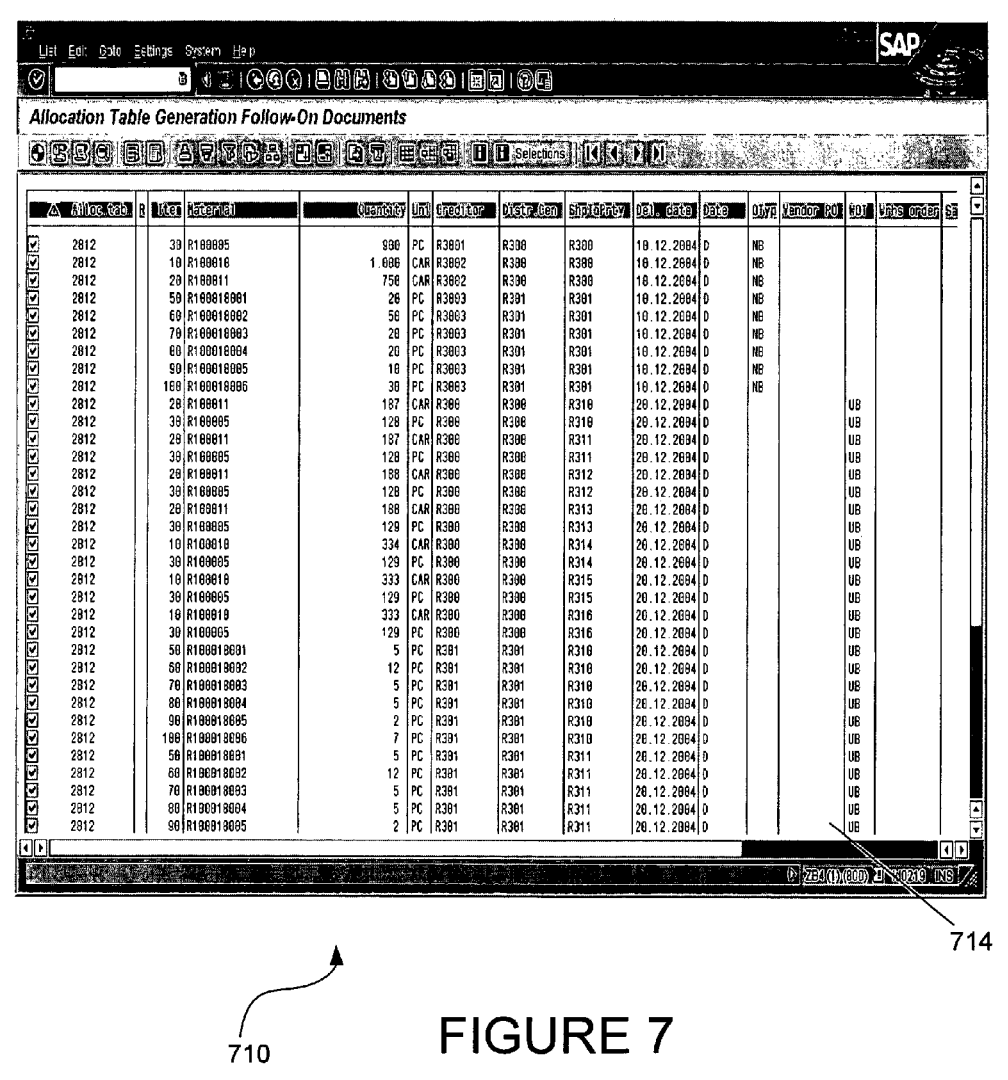

If all of the data in an allocation table is complete, then corresponding follow-on documents can be created. In one embodiment, if the vendor order has already been generated for a two-level allocation table for an allocation item, a user can no longer change the recipient quantities. In another embodiment, it is possible to change the delivery date or quantities or supplying distribution center as long as no follow-on document for a recipient (store or customer) is generated even if a vendor order exists. FIG. 7 illustrates a graphical user interface 710 which displays information for the generation of follow-on documents from an allocation table. Graphical user interface 710 includes a table region 714 which provides information regarding the stock split such as, but not limited to, article number, date, and quantity.

For the distribution process, it may be useful in some contexts to modify the recipient data for an allocation table item once the corresponding purchase orders have already been generated for external vendors. Various attributes of an allocation table item can be modified either individually or in combination. Changes to recipient data could include, for example, modified quantities or a new delivery date. It may be further desired for new recipients to be added or removed as a result of internal changes such as the opening or closure of retail sites. The vendor's delivery date may also be delayed. The quantity and delivery dates may also change between the time that a purchase order is created and the goods are to be physically delivered. This may result in the vendor order being changed. Purchase orders submitted to the vendor may also be subsequently changed due to internal circumstances, and the vendor may receive an updated purchase order. In this case, the purchase order quantity or delivery date could also change. It is also possible that the distribution center to which the goods are to be delivered may change, or that a purchase order item could even be cancelled.

Due to these changes to a purchase order item, in one embodiment, the allocation system can create allocation tables that belong to a purchase order item and the data in the purchase list which contains information regarding the quantities allocated for the stores). This is particularly useful if articles (e.g., fashion items) with a long lead time (production) have to be ordered. For example, a recipient's requirements may change between the time a purchase order is created and the goods are delivered. Thus, the purchase order has the vendor order information and the information on how to allocate (i.e., store and quantity information). In one embodiment, as a first step the vendor order is created, and then the allocation table is created as a second step. In a third step, the follow-on documents for the sites (i.e., store orders) was created by the allocation system. In an exemplary embodiment, the quantities allocated to some stores are fixed and the quantities allocated to other stores are determined based on allocation strategies. However, the total allocation quantity cannot exceed the total quantity ordered.

In order that the allocation table can react to a change in circumstances, it must be possible to change recipient data for an allocation item with existing vendor orders. However, changes to the recipient data in the allocation table cannot result in the purchase order data of existing vendor orders in the allocation table being changed.

In one exemplary embodiment, the term "synchronization" means that purchase order data in a corresponding allocation table will automatically be updated if the corresponding vendor order is changed. The data may be updated automatically, manually, or by a combination thereof. In one exemplary embodiment, data will be synchronized online. The relevant data constellation will determine whether data can be synchronized, or further, whether synchronization can be carried out automatically. The allocation table item may have to be changed manually in a second step (as described above), in order to redistribute to recipients the synchronized vendor purchase order quantity of the distribution centers.

In one exemplary embodiment, a business model of the present invention utilizes a budgeting system. The budgeting system may have an open to buy ("OTB") check. OTB budget is the portion of the current purchasing budget still available to spend.

As soon as a vendor order already exists for an allocation table item, the change in the purchase order item takes precedence over purchase-order-relevant changes to the allocation table item (due to the OTB check). The purchase order must first be changed to ensure that OTB budget is available. Therefore, a change to order-relevant data (vendor order) is not permitted in the allocation table. Changes must be made in the purchase order. In this case, the corresponding allocation table will be synchronized.

Although various changes to the allocation table are contemplated by embodiments of the present invention, in certain circumstances these changes may be limited to being made in a specific manner, within a specific range, or not allowed to be made. A user will be able to change recipient data for an allocation item if a vendor order has already been generated for this item. However, this will not be possible if follow-on documents (e.g., stock transport orders, third-party orders, deliveries, sales orders) exist for the item's recipients.

If a vendor order already exists for an allocation item, it will no longer be possible to change the relevant distribution center data of the allocation item (for example, vendor). If vendor orders have already been generated for an allocation item (as follow-on documents of the allocation table), but no follow-on documents have been created for the recipients, this allocation table item cannot be deleted. However, in this case, the allocation table item can be deleted in the allocation table by setting the deletion indicator in the vendor orders generated.

A purchase order change can only be synchronized for a generated allocation table for operational assortment planning and control (assortment planning) if the relationship between the purchase order item and allocation table item is unique. For example, if several items in the purchase order list (for different price-shop report items) are merged for one purchase order item, the unique relationship is lost and changes to the purchase order item cannot be synchronized with the allocation table.

In one exemplary embodiment, the allocation table is created directly from the assortment planning system. That is, the allocation table is created directly from the assortment planning system rather than from a purchase order (which is generated by the assortment planning system). In this embodiment, an allocation table is generated in every case referencing the purchase order and a purchasing list. In one embodiment, the assortment planning system includes a purchasing list having purchasing list items. The purchasing list item may include, but is not limited to, information such as generic article information, variant information, planned quantities, store delivery dates, prepack article quantities, and combinations thereof. The allocation table items are driven by and reflect the information in the purchase list items. Information for the purchase order list may be derived from a business intelligence database, manual input, feedback from the allocation system, or a combination thereof. In addition, changes, including manual changes, can be made to the purchase order list or the allocation table. This results in updated information being relayed to the assortment system and/or the business intelligence database.

The purchasing list contains information regarding orders from vendors and how to allocate the goods to the stores. With this information it is possible to generate a purchase order as a first step. Subsequently, it is also possible to generate an allocation table with the quantities for the stores directly from the purchasing list.

Figure 19:
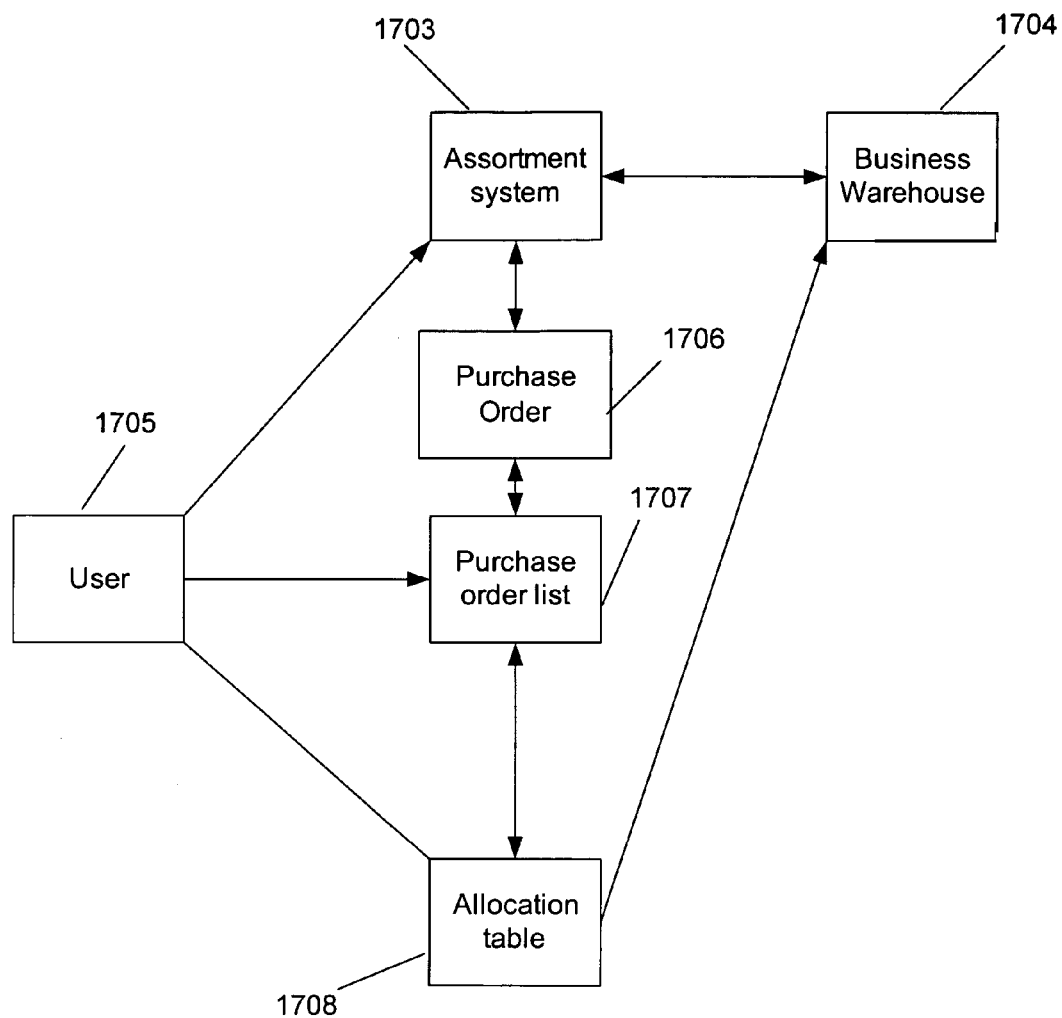
FIG. 19 illustrates a flowchart of one embodiment of the present invention wherein the allocation table is generated directly from the assortment planning system.

In one exemplary embodiment, the following steps are prerequisites to generate an allocation table:
create the purchase list
create the purchase order
generate the allocation table In one embodiment, illustrated by the flowchart of FIG. 19, an assortment system 1703 receives information from a business intelligence warehouse 1704 and/or from a user 1705, e.g. via manual input. If the assortment planning system is updated, such as with information from the user 1705, then the business intelligence warehouse 1704 may be updated. In addition, the assortment system 1703 generates a purchase order 1706. A purchase order list 1707 is then generated from the purchase order 1706, which also may receive input from the user 1705. If the purchase order list 1707 is updated by the user 1705, then the assortment planning system 1703 may be updated. The purchase order list 1707 is used to generate an allocation table 1708. The user 1705 may also provide information used for the generation of the allocation table 1708, in which case the purchase order list 1707 may be updated. After the generation of an allocation table as described, the allocation number and allocation table item is given as a link to the purchasing list.

In one embodiment, the purchase order 1706 may be generated from the allocation table 1708 (any dual level allocation table such as vendor—distribution centers—recipient), whereby the goods will be procured with an external vendor and delivered to recipients using distribution centers. Vendor orders will be generated for this allocation table item. In this case, the allocation table can be synchronized for the purchase order.

In another exemplary embodiment, an allocation table with reference to a purchase order is generated. In yet another exemplary embodiment, an ad-hoc purchase order is created followed by the creation of an allocation table with reference to this purchase order. In yet another exemplary embodiment, an allocation table is generated for operational assortment planning and control for fashion with reference to a purchase order.

In one exemplary embodiment, the recipient data in the allocation table is changed after a vendor order is created. Recipient data in an allocation table item may be changed due to internal circumstances that result in the date being changed for individual recipients, for example, a store opening or closing, or renovations. In this case, recipient quantities may also be redistributed and modified to suit the current recipient requirements. It may not be possible to update purchase orders from the allocation table, in which case order-relevant data (vendor order) cannot be changed in the allocation table.

In another exemplary embodiment, the recipient quantities of the allocation table may be changed (i.e., redistributed). The distribution quantities of individual recipients can be redistributed in the allocation table item. As vendor orders already exist for this allocation table item, the purchase order quantity of the distribution centers must not change. Therefore, when the recipient quantities are being redistributed, checks may be implemented to ensure that the accumulated quantities of the distribution centers do not change. This means that the total quantity of the allocation table item must also not change. In one embodiment, if this is not adhered to, the system will record this in the log of incomplete items. In an exemplary embodiment, if the cumulated quantity of all sites is higher than the ordered quantity, then the allocation table item will be marked as incomplete. If the quantity of all sites is less than the ordered quantity, a warning will be given.

In one exemplary embodiment, the delivery date for recipients in an allocation table may be changed. As vendor orders already exist for this allocation table item, the distribution center delivery dates must not be changed. Thus, the recipient's delivery dates may be checked against the delivery dates of the corresponding distribution centers in the log of incomplete items. If these dates are not adhered to, the system will record this error in the log of incomplete items, and the allocation table item is marked as incomplete.

In one exemplary embodiment, recipients in the allocation table may be added or removed. Recipients can be added (for example, store opening) or removed (for example, store closure) for an allocation table item. The specified item quantity must then be distributed among this higher or lower number of recipients. If the allocation table item is generated from an action, a user will not be able to change the recipients in the allocation table. In this case, a user will not be able to add or remove recipients for this allocation table item. The log of incomplete items will check the consistency of the changed allocation table item (see above). If a user changes the recipient data so that errors appear in the log of incomplete items, the allocation order item will be incomplete.

Continuing with this embodiment, if the changes to the purchase order item are relevant for the allocation table, this allocation table item will be synchronized with the changed purchase order item. In this context, the purchase order will only pass on consistent changes to the allocation table. This ensures that an OTB check is carried out for the changed purchase order item.

The type of allocation table modification carried out will depend on the change made in the purchase order. It must always be checked whether the allocation table can be modified. If follow-on documents already exist for at least one recipient for the corresponding allocation table item, it may not be possible to change the allocation table, and a corresponding error may be issued to the purchase order. If the allocation table is locked (that is, being edited) by another user or process, it will not be possible to change it, and a corresponding error message will be sent to the purchase order.

In a first step, the changes (purchase order quantities, delivery date, and so on) will be transferred for the corresponding distribution center of the corresponding allocation table item. In a second step, the system will try to consolidate these changes accordingly, on the distribution center, for the allocation table item. Then, the log of incomplete items will be called to check the consistency of the changed allocation table item. If the allocation table item was changed so that errors appear in the log of incomplete items, the allocation table item will be marked incomplete.

Corresponding confirmation is sent to the purchase order. In this context, a log of any error that occurred (for example, the allocation table is incomplete) will also be transferred. In one embodiment, the purchase order must react suitably to this confirmation, and provide a log. If the user does not save these changes, the changes to the purchase order and the allocation table are lost, and both documents will have the status they had before changes were made.

When the user posts the purchase order, the changed allocation table items will also be posted. If errors exist in the allocation table items, these will be posted with the status "incomplete." In one exemplary embodiment, a user must manually, retroactively edit incomplete allocation table items on the allocation table's maintenance screen.

In one exemplary embodiment, the step of changing data in the allocation table comprises the step of changing the quantity in the purchase order item. If a user changes the purchase order quantity (either number of units or the unit of measure) in the purchase order item, in the first step, the corresponding allocation table item will be transferred as the new purchase order quantity for the corresponding distribution center of the relevant allocation table item.

In a second step, the system will try to automatically redistribute the changed purchase order quantity across the recipients involved. As several distribution centers may occur for each allocation table item and the changed purchase order item refers to one distribution center, the new purchase order quantity of the corresponding distribution center must be redistributed across the recipients involved. At the distribution center level, this type of modification of the previous recipient quantities may be carried out as a percentage of the previous allocation table quantities. If the purchase order quantity was only changed using a different unit of measure, this step may be omitted.

The log of incomplete items will check the consistency of the changed and calculated quantities. If an error occurs in this context, the allocation table item will be incomplete.

In one exemplary embodiment, the step of changing data in the allocation table comprises changing a date in the purchase order item. If a user changes the delivery date in the purchase order item, in the first step, the date will be transferred as the new purchase order date for the corresponding distribution center of the relevant allocation table item.

From the recipient's viewpoint, the system does not react to date changes. The recipient's delivery dates are checked against the delivery dates of the corresponding distribution centers in the incompletion log. If these dates are not adhered to, the system will record this error in the log of incomplete items, and the allocation table item is marked as incomplete.

In another exemplary embodiment, the step of changing data in the allocation table comprises the steps of changing the distribution center in the purchase order item. If a user changes the distribution center in a purchase order item, the corresponding distribution center record of the allocation table item will be replaced accordingly in a first step. In a second step, the distribution center will be replaced accordingly for the corresponding recipient. The log of incomplete items will be checked for consistency of the changed allocation order item. If an error occurs in this context, the allocation table item will be marked as incomplete.

In another exemplary embodiment, the step of changing data in the allocation table comprises deleting the purchase order item (purchase order item deletion indicator). If the deletion indicator is set for the purchase order item, it must be determined whether the purchase order was created as a follow-on document of the allocation table, or if the allocation table was created with reference to the purchase order. If the allocation table item was created with reference to the purchase order item, the entire allocation order item refers to this purchase order item. In this case, the entire allocation order item will be deleted. In the purchase order item, the reference to the allocation table item (allocation table number and item number) must be deleted. On the other hand, if the purchase order item was generated as a follow-on document of the allocation order item, the purchase order item will relate to the delivery phase of a distribution center in the allocation table item.

In a first step, the corresponding delivery phase of the pertinent distribution center of the allocation item will be deleted. If this is the only delivery phase for the distribution center, the distribution center record will also be deleted. If other delivery phases exist for the distribution center, the purchase order quantity of the purchase order item (for which the deletion indicator was set) will be deducted from the purchase order quantity of the distribution center. In the purchase order item, the reference to the allocation table item (allocation table number and item number) must be deleted.

In a second step, these changes will be transferred to the recipients in the distribution center. If the distribution center was deleted, all relevant recipients of the distribution center will also be deleted. If all recipients received deliveries from this distribution center, the entire allocation table item will also be deleted. If the distribution center had several delivery phases, and if the purchase order quantity of the distribution center was reduced as a result, this reduced purchase order quantity will be distributed across the recipients involved, as a percentage of the previous allocation quantities.

The log of incomplete items will check the consistency of the changed allocation order item. If an error occurs in this context, the allocation table item will be incomplete.

In one exemplary embodiment, a modification-free customer enhancement is provided to allow a user to manually consolidate allocation table data following the changes in distribution center data. The modification-free customer enhancement will be enabled before consolidation of the transfer of changes of the distribution center to the entire allocation table item (second step in the procedure outlined above). Here, a user will be able to select a corresponding indicator to suppress the automatic breakdown of the changed distribution center data on the entire allocation table item. In this case, the allocation table item may be incomplete, and consolidation must be carried out manually and retroactively on the allocation table maintenance screen.

If the allocation table was created with reference to a contract, the vendor order serves as a release order. In this case, the system must examine whether the changes made to the purchase order item can be reconciled with the contract. In particular, the quantity restrictions specified in the contract must be adhered to. This means that the contract does not need to carry out a special check to ensure that the terms of the contract are adhered to.

Adding a new purchase order item does not have any impact on the allocation table. New purchase order items do not yet have an allocation table reference, and are treated in the same way as other ad-hoc purchase order items. Any allocation table items created for these purchase order items must be created manually (allocation table with reference to a purchase order).

Changes may be made to the allocation table at any time, on a repeated basis, provided the prerequisites described above are adhered to. In this context, the volume of data is identical with the allocation tables created or the corresponding changes made to the allocation table (without existing follow-on documents).

In another exemplary embodiment, a recipient matrix is provided. The recipient matrix is a display in the allocation table that allows a user to display and change the planned quantities for all recipients of several allocation table items on one screen of a graphical user interface. Once the article has been distributed, a new matrix display (recipient matrix) may be used to provide an overview of the distribution of the generic article or of all generic article variants for all recipients on one screen. The recipient matrix displays and processes the planned quantities for recipients.

In one exemplary embodiment shown in FIG. 8, a recipient matrix 820 has a tabular form with recipients on a x-axis 823 (rows) and article variants on an Y-axis 822 (columns). This recipient matrix display provides recipients on a first dimension and data regarding articles allocated to those recipients on a second dimension. This is in contrast to the normal allocation table overview (FIGS. 2 and 6) which display the article on a first dimension and information relating to the article on the second dimension. Thus the recipient matrix provides an alternative display which can be more user friendly when seeking information on a store basis (as opposed to on an article basis). In this exemplary embodiment, each element, node, or cell in the recipient matrix represents a recipient's planned quantity for one article variant (with the exception of elements in the totals row/column). A column 825 is provided with the total allocation of the generic article (sum of all of the article variants displayed) for the stores displayed. A row 824 is provided with totals for each variant, of the article displayed, across all of the stores displayed. For example, as shown in FIG. 8, element 821 represents the recipient store 1 being allocated ten articles of size 36, in red.

In an exemplary embodiment, the allocation table may be viewed in an allocation table item overview. In the allocation table item overview, a user is able to select different articles (allocation table items) and call the corresponding new recipient matrix.

In another exemplary embodiment, planned quantities of the matrix may be modified (for example, due to a rounding profile), followed by another call of the matrix with changed values. Thus, the recipient matrix has connectivity with the rest of the allocation system such that when corresponding values are changed, the recipient matrix is changed and may be called up to display the new information, such as revised article quantities.

In one exemplary embodiment, the recipient matrix allows a user to sort according to characteristics (only when generic article is used for call). The allocation tables are made available and updated (broken down into delivery phases, aggregation at item recipient groups, and so on). Processing of the changed values of the recipient matrix occurs, taking account of the function codes, when exiting the matrix.

Figure 10:
FIG. 10 illustrates an exemplary embodiment of a detail screen for a recipient matrix displayed on a graphical user interface.

In one embodiment shown in FIG. 10 a user will be able to call a detail screen 1030 for a recipient matrix element. Detail screen 1030 displays information on the referenced article in a list format. The information includes variant number 1031, customer information, 1032, and type of variants 1033 such as size 1034 and color 1035. In addition, in an exemplary embodiment, the detail screen provides details on the referenced recipients.

The data that will be required to call the recipient matrix will usually be available at the time the internal table of the allocation table is called. This data does not need to be read for the call from the database. However, only items for which at least one recipient record exists will be transferred to the matrix for display purposes.

In an exemplary embodiment, a check is performed to determine whether the recipient matrix has been used to change an article quantity, as well as to determine which items can be changed and in what way. Here, a check is required to determine if vendor orders already exist for the current allocation table item to allow the recipient's quantities, but not the entire quantity of the item, to be changed. If several distribution centers exist for each item, the check must be carried out for each distribution center. In one embodiment, the total quantity for all recipients of a distribution center for which a vendor order already exists must remain the same. In another embodiment, a lower quantity will lead to a placement in storage. If only one distribution center exists for each item, the total quantity must not be changed again. If new quantities are determined during the quantity adjustment (for example, due to rounding), or if the system determines when the above-mentioned check is being carried out that quantity overruns occurred, a log will be updated and displayed using the module. If it is no longer possible to change an item, all corresponding elements will also no longer be ready for input in change mode (during element definition).

In an exemplary embodiment, if a user navigates from the recipient matrix back to the item overview, the changed values may be returned. The ability to add new entries must also be deactivated in the matrix list mode, as no new recipients or articles can be added.

In an exemplary embodiment, when the recipient matrix is called, the following steps will be carried out: (1) determine all recipients for all items and set up internal table; (2) supply matrix modes (list mode, value mode); (3) define and supply header screen; and (4) define axis such that default Y-axis is the recipient-specific axis, and X-axis is the article-specific axis.

In one embodiment, when a user activates a element in the matrix, such as by double clicking on a computer mouse, the allocation detailed information for referenced recipients and element articles is called up, such as from a global internal table. Thus, determination of detailed information on a element is possible. This may be particularly important if the corresponding information displayed on the article or recipient is insufficient, such as due to a character restriction in the line/column heading. In an exemplary embodiment, a determination of the detailed information on the element, selected such as by a double-click of a mouse, is made based on the article type. For variant articles a determination of the variant-creating characteristics is made. For structured articles, a determination of the components of the structured article is made.

Two header screens that contain specific information and contain function keys will be required for the recipient matrix. Such information includes, for example, the number of chosen articles/items. If a generic article is used or only variants of one generic article, the generic article (number) with its description is displayed. In one exemplary embodiment, function keys are provided for: (1) displaying options a) for the article display article number or description or characteristics, b) for the recipient display address name or site number, and c) recipient/article row or column; and (2) sort options for the articles.

Figure 9:
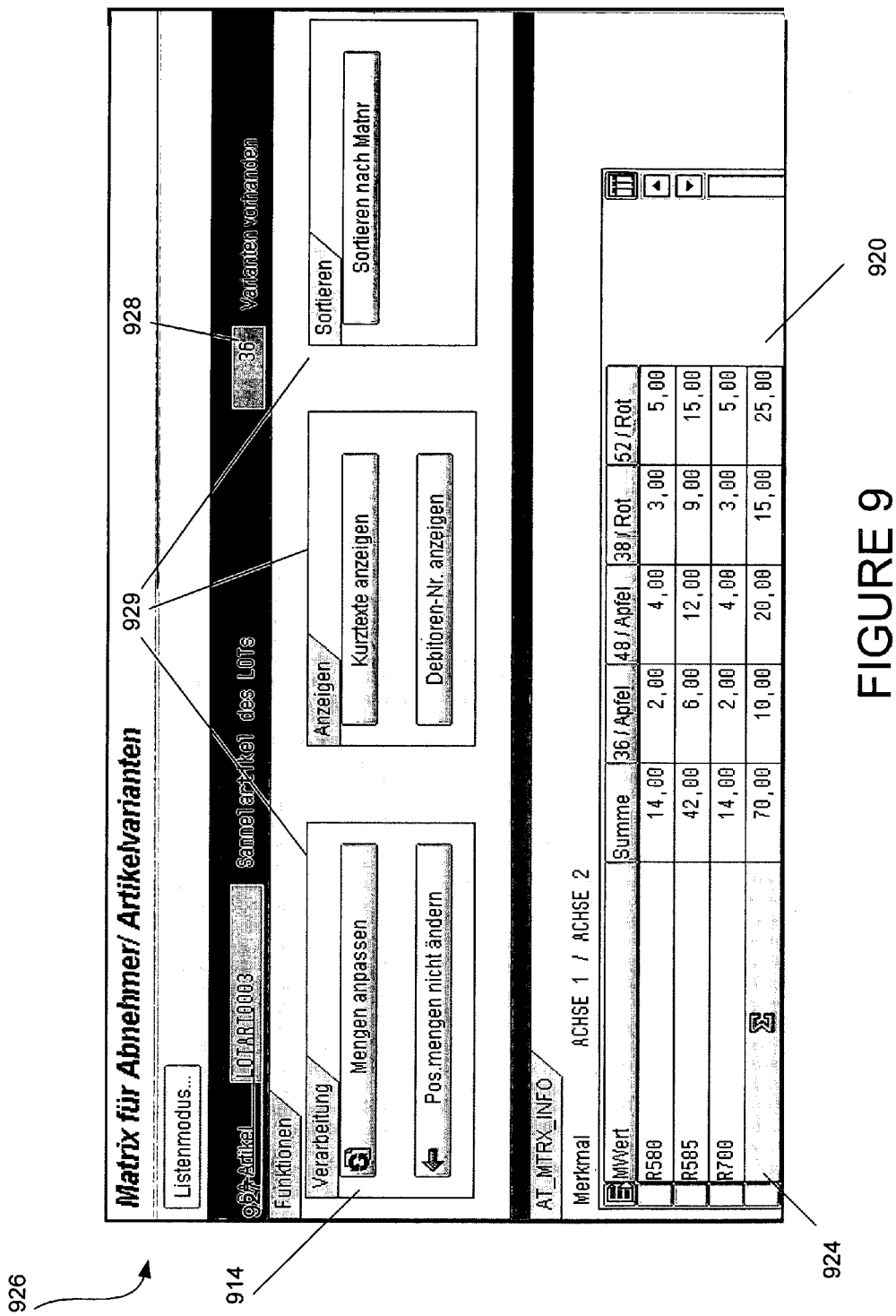
FIG. 9 illustrates one exemplary embodiment of a graphical user interface displaying a recipient matrix.

In one embodiment shown in FIG. 9, a graphical user interface, such as a screen 926, is required for the recipient matrix for selected articles. Screen 926 displays information on the number of articles and the functions allocated with the recipient matrix. Screen 926 includes a header screen 914 for the generic article recipient matrix 920. In one embodiment, this screen 926 displays the article number 927 and the text of the underlying generic article, as well as the total number of variants 928. Function keys 929 may also be provided, such as but not limited to: (1) adapt quantities; (2) do not change item quantities; (3) change article heading (dynamically in line with headings from data element); (4) change recipient heading (dynamically in line with settings from data element); and (5) sort according to characteristic (dynamically, based on the characteristics, only possible for call using generic article). The functions may be labeled accordingly in a group box or individually.

Figure 11:
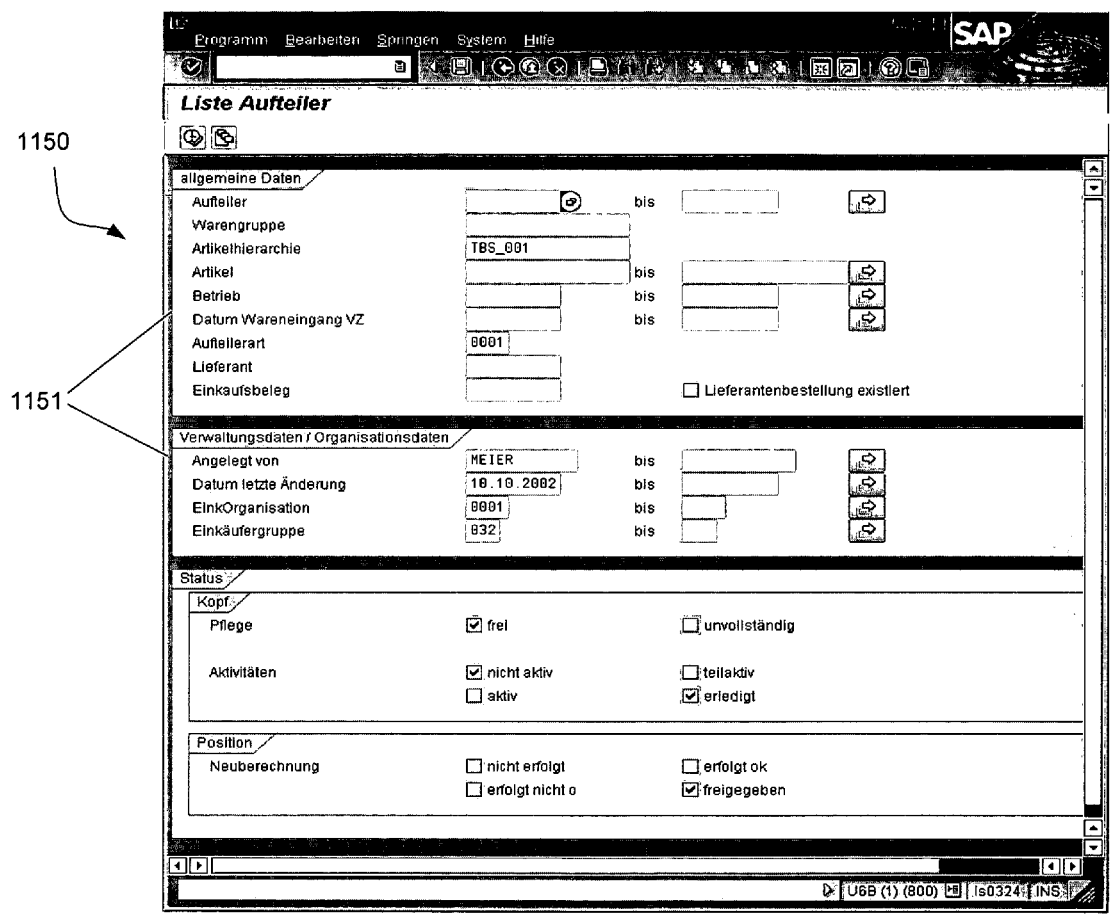
FIG. 11 illustrates an exemplary embodiment of a selection screen of the present invention.

In another exemplary embodiment, the allocation system includes a search process with a selection mechanism for searching and displaying allocation tables that match specific search criteria. As shown in FIG. 11, the allocation selection mechanism may include an allocation table list 1150 which includes various selection criteria 1151 which may be used to search for specific allocation tables. Such criteria may include, but are not limited to, allocation table number, article group, article hierarchy level, article, site, allocation table type, goods receipt date for the distribution center, supplier, purchase order number, whether a vendor order exists, created by, date of last change, purchasing organization, purchasing group, maintenance status values, activity status values, and recalculation status values. In an exemplary embodiment, specific criteria is set by default to avoid the use of large-scale data sets which would result in long run times. For example, if an allocation table number is not used, then at least one head selection criterion of the allocation table must be used. In one exemplary embodiment, when less than two header criteria are used, a warning message is displayed alerting the user that the search process may take a long time and may result in numerous entries. In an exemplary embodiment, in an attempt to prevent the search process from resulting in an unwieldy amount of data, the following criteria are therefore checked:

- If a user uses (an) allocation table number(s) for the selection, the selection is carried out and the output list issued at the first level (on the upper tree control screen area).
- If a user leaves the allocation number selection field blank, the selection is only permitted if at least one header criterion of the allocation table is specified. Header criteria may include the following: allocation table type, purchasing organization, purchasing group, name of the person who created the entry, date of the last change, maintenance status, and activity status.
- If a user enters less than two header criteria, a warning message appears to inform a user that the selection may result in long result times, and that the output list may contain so many entries that it will be difficult to process. The selection is implemented if a user confirms.
- If a user selects a combination of criteria that may result in a long runtime and produce a large output list, an appropriate warning will appear. A user will be able to cancel the selection, or execute it if the user confirms so in a dialog box that appears. For example, this is the case if all status criteria are selected.

Figure 12:
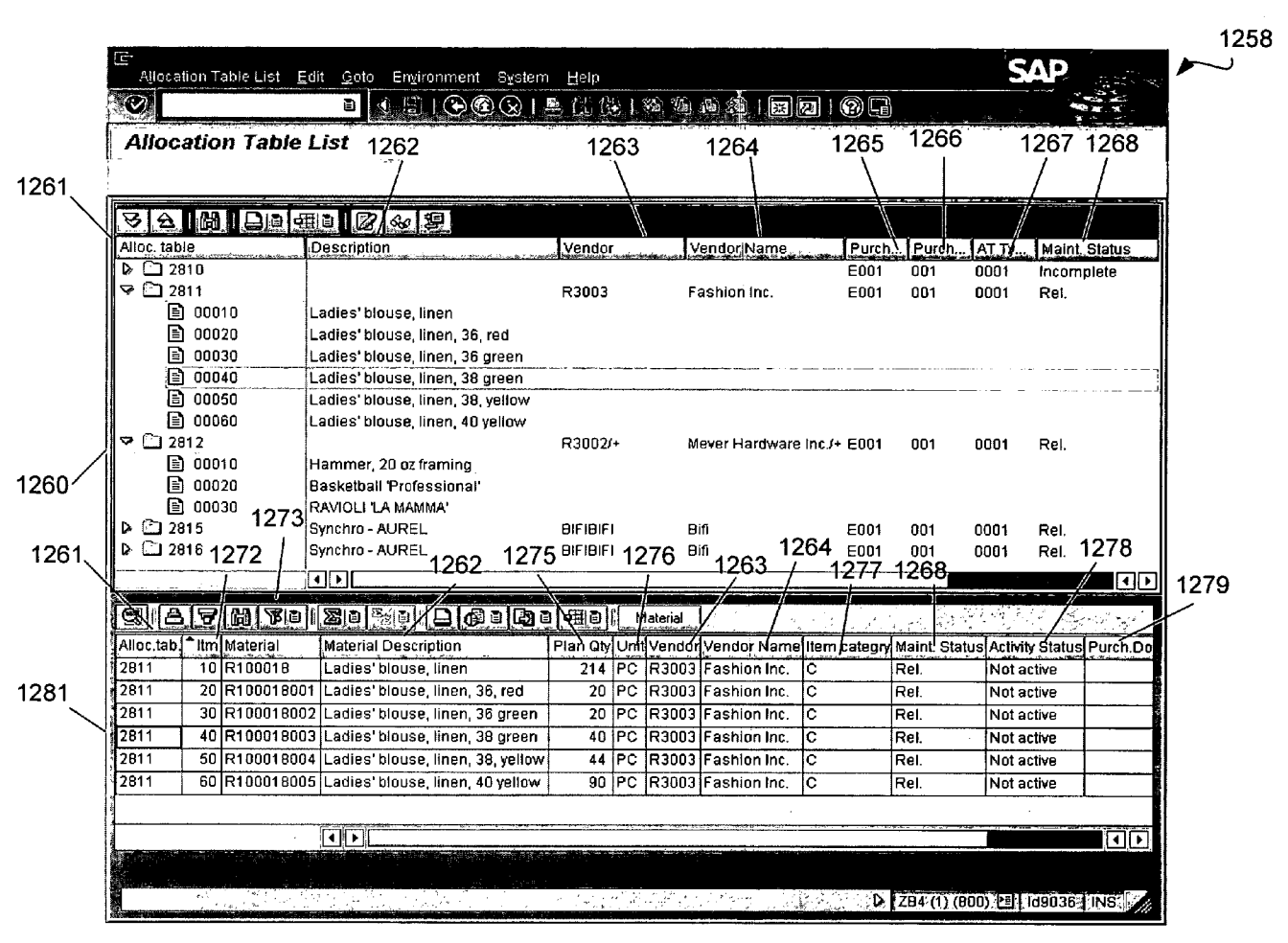

The search process results in a report for displaying the results of the search process. In an exemplary embodiment, the report displays information from the selected allocation tables in a compressed format at two levels. FIG. 12 illustrates an allocation table list 1258 displayed on a graphical user interface. In an exemplary embodiment, a first level display 1260 includes allocation table number 1261a, description 1262a, supplier (such as by name 1263a or account number 1264a), purchase organization 1265, purchase group 1266, allocation table type 1267, maintenance status 1268a. Also included is a function that allows expansion of the display to show a second level 1281. Other information may be shown such as but not limited to activity status, created by, and creating application. In an exemplary embodiment, the header-level allocation table information and some of the allocation table distribution center data are displayed at level one 1260.

The display at level two 1281 will display allocation table information at the item level, along with some of the allocation table distribution center data. The level two display 1281 includes, allocation table number 1261b, item number 1272, article number 1273, description 1262b, quantity (planned quantity item) 1275, distribution unit of measure (UoM) 1276, supplier (account number) 1263b, supplier (name) 1264b, item category 1277, allocation table maintenance status 1268b, allocation table item activity status 1278, and purchase document 1279. In an exemplary embodiment, as with the first level, the distribution center data is not actually displayed at the allocation table item level (which means that an allocation table item can receive deliveries from more than one distribution center). This data is not unique at the item level. Therefore, only the first distribution center identified for the first allocation table item, and the corresponding supplier, can be displayed here. If other distribution centers exist for the allocation center, these are displayed using an indicator.

In an exemplary embodiment, the distribution center data is not actually displayed at the allocation table header level (which means that an allocation table can contain more than one distribution center). This data is not unique at the header level. Therefore, only the first distribution center identified for the first allocation table item, and the corresponding supplier, can be displayed. If other distribution centers exist in the allocation center, these are displayed using an indicator.

In another exemplary embodiment, the search process includes a mechanism for restricting the initial selection scope. Another block will be displayed on the selection screen to restrict the initial selection scope for displaying the allocation table headers (display options), reduce the dataset to be read as required, and minimize the response time up to the first time the allocation table header is displayed at level one 1260:

Never display distribution center and delivery dates: the distribution center and delivery dates will not be displayed either on the upper or lower screen area.

Display distribution center and delivery dates at a later stage: the distribution center and delivery dates are initially not displayed on the upper screen area. As soon as a user selects an allocation table on the top screen area to transfer and display its items to the lower screen area, or when an allocation table is expanded on the top screen area the distribution center and delivery dates are displayed.

Display distribution center and delivery dates immediately: the dates distribution center and delivery dates for the selected allocation tables are immediately displayed in both screen areas. However, if a user specifies the delivery date as a criterion on the selection screen, the delivery dates are displayed immediately.

Figure 13:
FIG. 13 illustrates an exemplary fast change display.

In another aspect of the present invention, a fast change process is provided to allow a user to change specific values at the item level or an item's retail site level. As shown in FIG. 13, a fast change display 1385 is provided. A user can select one or more items, then call the fast change screen such as by a fast change button (not shown), then enter the new values and, if necessary, some restrictions (for example, do changes only for sites which are delivered by a specific distribution center). Fast change at the item level may include site group, allocation rule, item category (controls the logical sequence from the procurement of an article to goods receipt for the article in a store), allocation strategy, and recipient determination. Fast change at the recipient level for an item may include supplier, distribution center, notification category (determines how data is exchanged between head office and the retail sites or distribution centers), confirmation request date, and delivery date.

If, for example, the delivery date is changed using the fast change function, this date is changed for all retail sites for items selected for fast change.

Restricting the recipients affected by a change will allow a user to carry out changes only for specific recipients of an item. This will be implemented as an enhancement of the item fast change function. In an exemplary embodiment, the following options are available for restricting item fast change:

The change applies only for recipients that are entered directly.

The change applies for recipients that receive deliveries from the distribution center specified.

The change applies for recipients that receive goods from the specified suppliers.

The change applies for recipients that receive deliveries on a specific date.

A change option for item data that is relevant to recalculation may also be added to the fast change function. The corresponding fields may be added on the item fast change screen (recalculation-relevant indicator, strategy, variant, days or goods receipt for distribution center).

Due to merchandise controlling issues, it may be necessary to distribute the remaining goods in a distribution center using an ad-hoc allocation table. This distribution may be either a stock reduction or a return of goods to recipients. In this context, the articles involved will be recorded in an article list by merchandise controlling. Thus, in one exemplary embodiment allocation tables may be created for an article list.

When an allocation table is created that refers to a purchase order (i.e., an ad-hoc allocation table), the allocation system displays a selection screen for choosing the purchase orders in the first step. The purchase order items a user selects in this first step are displayed in a second screen, where the user can transfer these selected purchase order items to the allocation table. The selection screen provides a plurality of parameters which allow a user to select specific purchase orders. Such parameter may include, but is not limited to, the delivery date for the distribution center.

In another exemplary embodiment, when an ad-hoc allocation table is created the allocation system displays a selection screen for choosing articles in a first step. The articles selected in the first step are displayed in a second screen where the user can transfer the selected articles into the allocation table. In one exemplary embodiment, a function is provided to allow multiple article selection, such as by allowing the selection of an entire article list. The corresponding articles will then be transferred to the article selection option on the allocation table selection screen. Article selection, in one exemplary embodiment, allows for the selection of articles for a element in the article hierarchy. If a user specifies a element for an article hierarchy, the system will select the corresponding articles. These corresponding articles are then displayed on the second screen and may be selected for transfer to the allocation table.

In one exemplary embodiment, allocation strategies may be utilized as an alternative to allocation rules, the equal allocation of quantities, and the manual entry of site quantities. Allocation strategies allow ratios and quantities to be determined for each retail site, using customer-specific allocation procedures. Allocation strategies can be used to allocate a specific planned quantity of an allocation table item across recipients. Allocation strategies can also be used to determine quantities for the recipients of an allocation table item. These quantities are then accumulated as the planned quantity for the item. In this context, allocation strategies are sets of rules in that they constitute influencing factors/parameters used to allocate quantities. However, allocation strategies, as opposed to allocation rules, can be dynamic and reflect a business's changing allocation needs.

In one exemplary embodiment, when an allocation table is created, the allocation type proposes an allocation strategy. The default allocation strategies can be changed for each item. In one embodiment, an allocation strategy is a function module which is integrated for use via customizing by a user. In one embodiment, allocation strategies are predetermined. Some strategies are delivered as standard coding, but strategies developed by the customer can also be used. In another exemplary embodiment, the allocation strategy is automatically implemented at the item level if retail sites exist for an allocation item.

Both parameterizable and non-parameterizable allocation strategies may be used in accordance with the principles of the present invention. Non-parameterizable allocation strategies operate substantially in the background, requiring little or no input from a user. In other words, a user determines the allocation strategy and does not need to input any other entries as regards quantity calculation by the selected strategy. In contrast, a user must enter specific data for parameterizable strategies. In one embodiment, parameterizable strategies also can run in the background, when given default values for the parameters. In one exemplary embodiment, the business intelligence warehouse only returns a key figure (i.e., non-derived values or quantities) for each recipient. Allocation strategies can be used to extract data from the business intelligence warehouse, for example, by implementing queries in the business intelligence warehouse. In one exemplary embodiment, the queries that can be used in allocation strategies must contain at least three characteristics and one key figure. In one embodiment in which low-medium-high structure (LMH) and/or seasons are used, a user will be able to add an optional fourth characteristic (LMH structure or season) to the query selection. In this embodiment, the following characteristics may be available:

Retail site or customer.

Article, article group, or element of the article hierarchy or theme structure.

Time characteristic (i.e., day, week, month).

Optional characteristic of the LMH structure or season.

In order to be able to transfer the characteristic values (for example, retail sites, articles, analysis period) that are used for the analysis to the query, the characteristics will be assigned to selection variables. The key figures may well come from different sources such as but not limited to historic data of the operative system, planned data (for example, from Microsoft Excel®), or from a forecasting tool.

The following features may be utilized in various embodiments for parameterizable strategies:

Consideration of data from the business information warehouse at the level of the article hierarchy or theme structure level.

Consideration of the characteristics LMH (Low, Medium, and High price range), season for call of the business intelligence warehouse.

Consideration of minimum/maximum values for shortages/surpluses during recalculation.

Consideration of minimum/maximum values for each store from the article master.

Fixed item quantity (distribution of remaining quantity).

In one embodiment, store/article hierarchy/indicator from LMH structure/period and store/article hierarchy, season/period indicator are required as levels for aggregation of key figures. In each case, one of the following key figures can be selected in the strategy: (1) current stock (store stock at time of evaluation), (2) goods recipient ("GR") (quantity, sales price achieved) sales (quantity, sales price achieved), and (3) goods receipt calculation: ~100−[(purchase price*116)/sales price]. The calculation for goods receipt may be carried out as follows:

Purchase price=$5, sales price=$10 goods receipt calculation=100−[($5*116)/$10]=42

The same calculation is performed to determine costing achieved, except with sales price achieved instead of sales price. The allocation strategy needs one key figure, however it does not matter which figure is taken into the query.

In one exemplary embodiment, several parameters are taken into consideration. Article hierarchy level or the theme structure with the key figures will be determined using the business intelligence warehouse. The characteristics low-medium-high and season are also considered when the business intelligence warehouse is called. For example, in merchandise category "ladies blouses," there are high-medium-low-priced blouses. Thus, a user can query for the sales in a particular merchandise category with the option of further limiting the search to a specific price category, e.g., low priced blouses.

Here, either a characteristic from the LMH structure or a seasonal characteristic will be evaluated during an access from the business intelligence warehouse. In one embodiment, if values already exist for the recipients—as in recalculation—surplus/shortage quantities specified during recalculation must not be exceeded. Also, consideration may be given to minimum/maximum values for each store from the article master. In the article master, the article planning parameters minimum safety stock and maximum must be evaluated as minimum/maximum stocks for each store. Furthermore, the planned quantity of item is treated as fixed (distribution of remaining quantity in line with item settings). This parameter is required where it must be assumed that the planned quantity of the item cannot be changed for specific allocation table processing procedures (for example, recalculation, allocation table with reference to a purchase order). Remaining quantities (positive surplus/negative shortage quantities) that arise due to rounded values must be distributed. In one embodiment, a fixed item quantity indicator is provided. If the fixed item quantity indicator is selected, the distribution of the remaining quantity will be done within the strategy, which means the given planned quantity will not be adjusted. This is relevant when a user ordered the goods before, and does not want to allocate exactly this quantity (i.e., no remainder in the storage).

If remaining quantities exist, the system proceeds in line with the remaining quantity distribution in the item. The following options for distributing remaining quantities are available in the one embodiment:

Accept remaining quantities—adjust entire quantity (not permitted if the item quantity is fixed).
Remaining quantity on a retail site with largest stock split.
Remaining quantity on a retail site with smallest stock split.
Remaining quantities on several retail sites with largest stock split.
Remaining quantities on several retail sites with smallest stock split.

Figure 16:
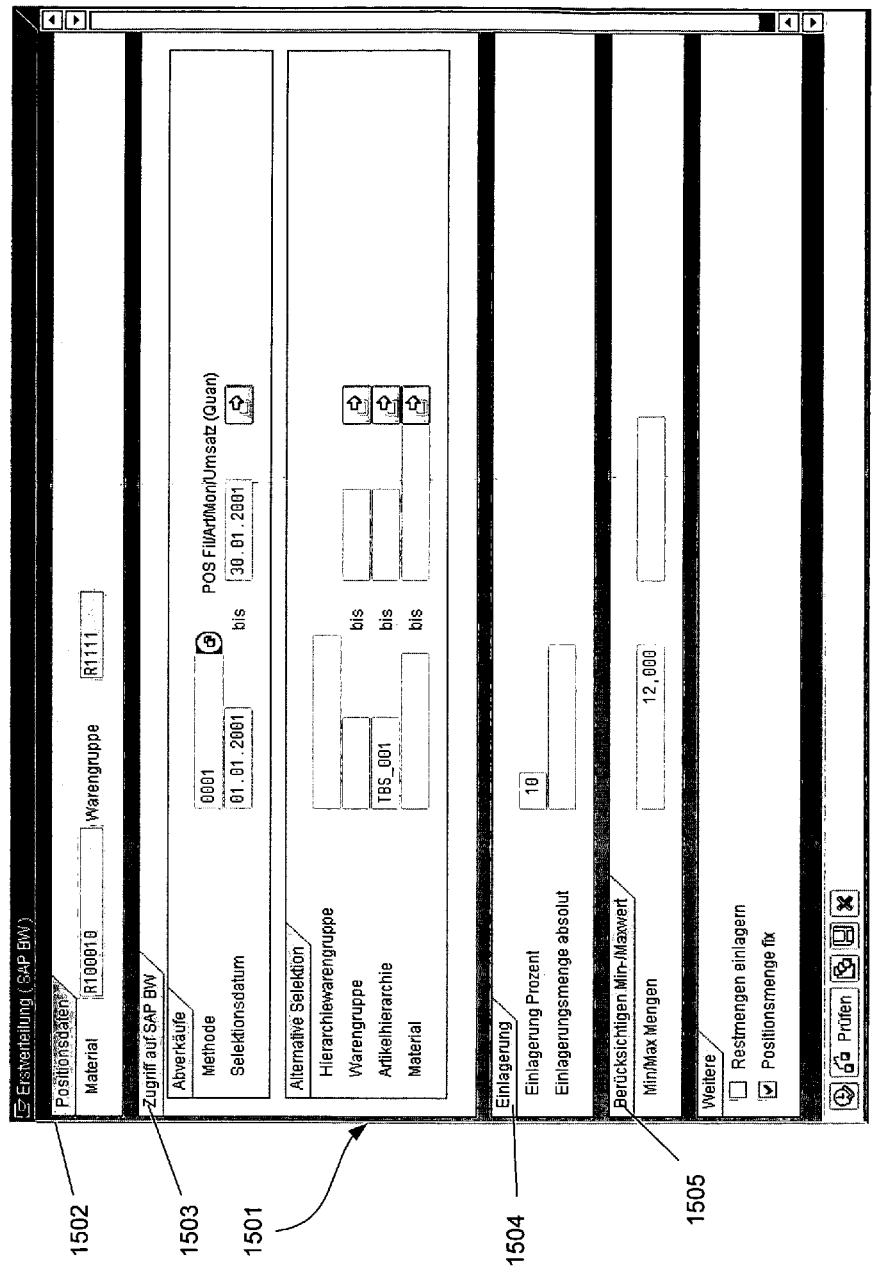
FIG. 16 depicts an exemplary embodiment of a selection screen for a parameterizable allocation strategy displayed on a graphical user interface.

FIG. 16 depicts an exemplary embodiment of an initial screen for a parameterizable allocation strategy. The initial screen 1501 is displayed on a graphical user interface. The initial screen 1501, item data section 1502 (information), search criteria section 1503 for accessing the business intelligence database, parameters section 1504 to consider storage when calculating quantities for each recipient (site/customer), and deviation parameters section 1505. In one exemplary embodiment, the sections 1501-1505 give a structure to the selection screen, i.e., an area for business warehouse selection. In one embodiment, the predetermined rule utilizes historical data, such as from the intelligence business data warehouse, to determine the variable quantity to be allocated to each store. This embodiment allows the past performance of a store to be considered during allocation on a rolling basis.

Figure 14:
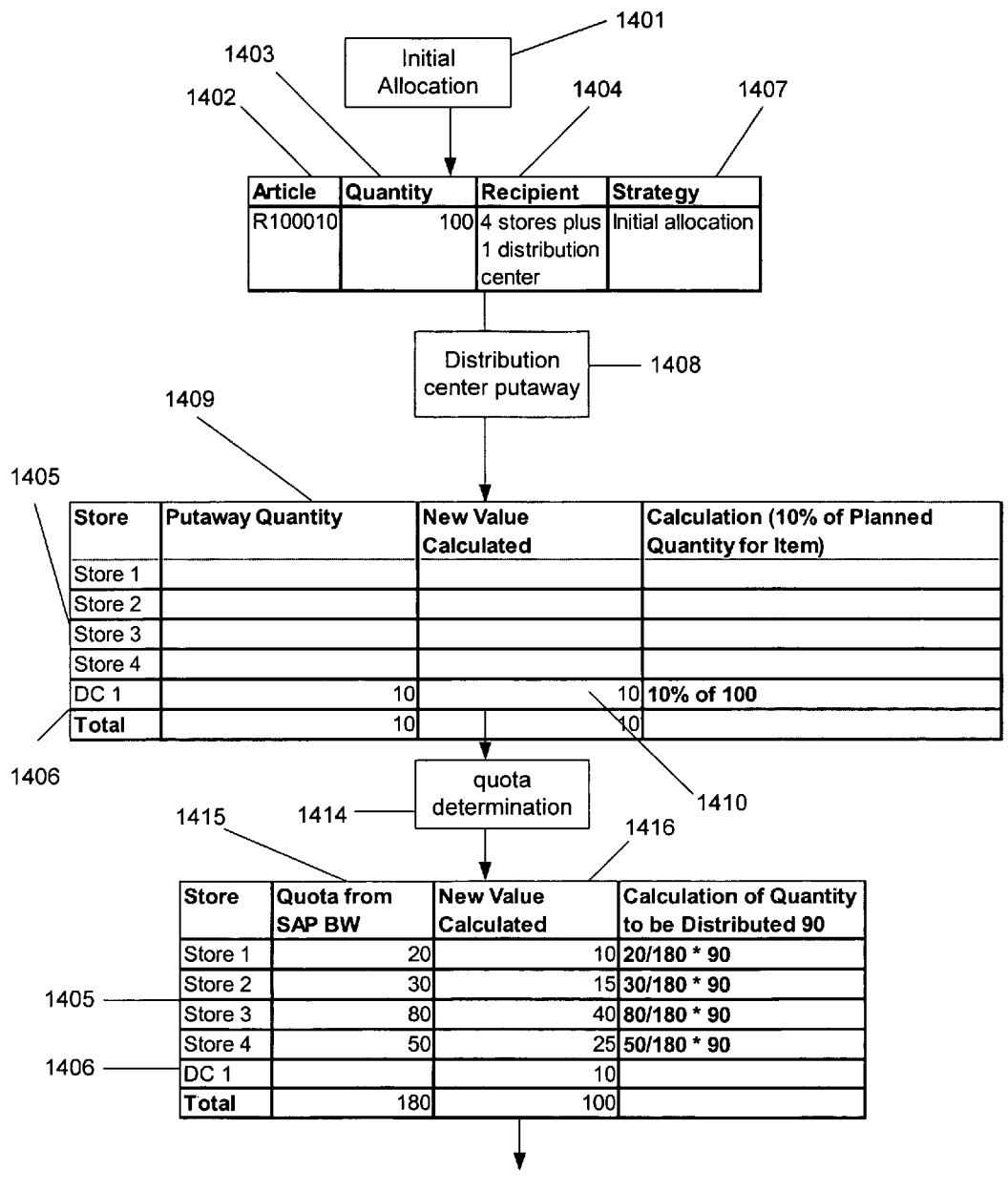
FIG. 14 illustrates an exemplary process for calculating the quantity of an article to be distributed to recipients.
Figure 15:
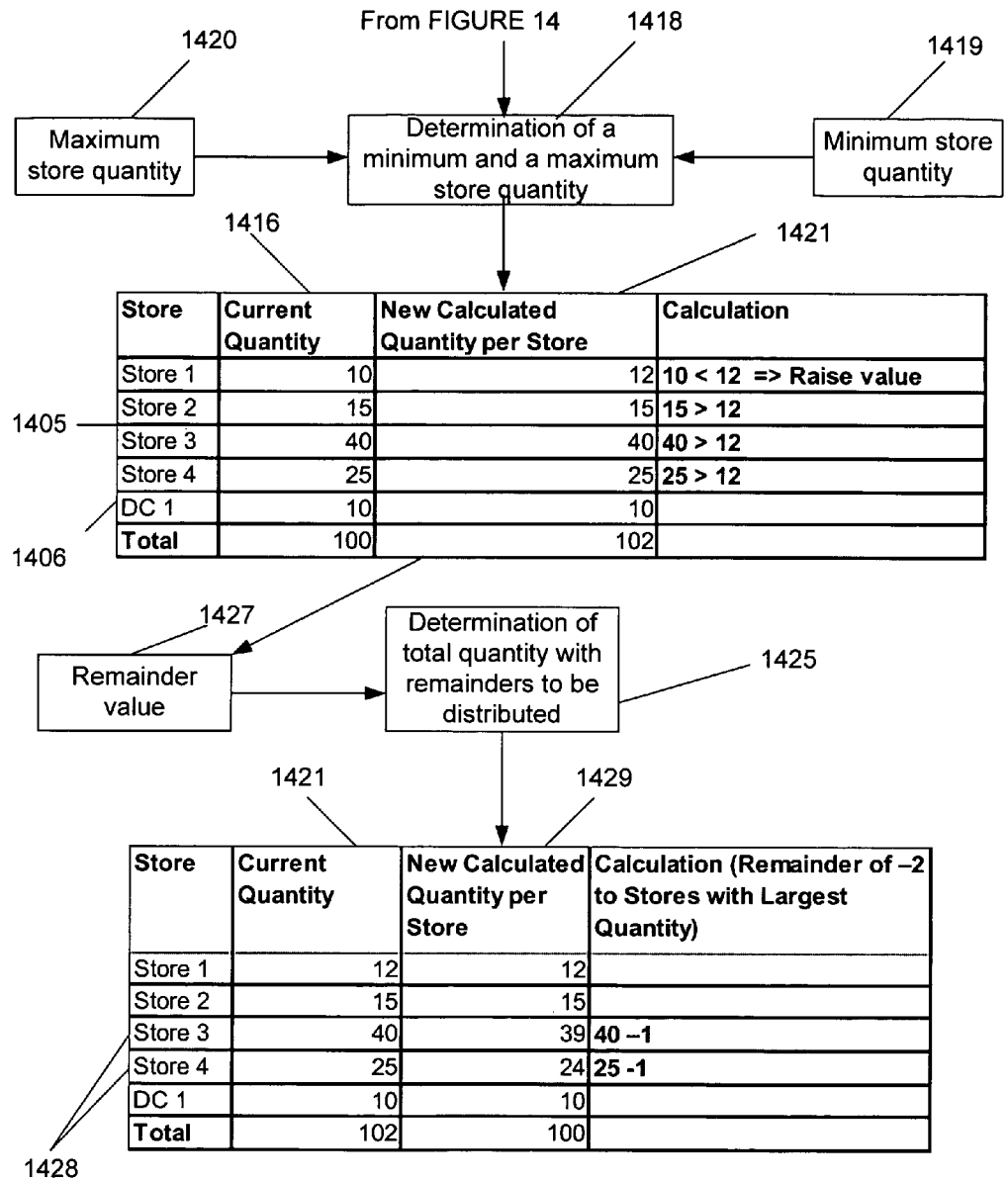
FIG. 15 is a continuation of the process of FIG. 14.

FIGS. 14 and 15 depict a sample calculation associated with the initial distribution screen of FIG. 16. The quantity 1403, recipient 1404 (e.g., stores 1405 and distribution center 1406), and allocation strategy 1407, are provided for the article 1402 being allocated. For example, FIG. 14 depicts an initial allocation step 1401 with allocation of 100 pieces of article R100010 to four stores and a distribution center. In a distribution center putaway step 1408, a specific quantity (here 10 percent) of the total quantity of the article being allocation is placed in the distribution center (putaway quantity 1409), leaving the quantity to be distributed 1410. Thus, in FIG. 14, ten units of the article 1402 are placed in the distribution center as putaway quantity 1409.

In a quota determination step 1414, the quota 1415 for each store 1405 with respect to the article 1402 is determined such as by querying the business intelligence warehouse. The quotas 1415 are summed and the quota for each store 1405 is determined as a percentage of the sum. A new value is calculated based upon the quotas by multiplying this percentage by the total quantity to be distributed 1410 to arrive at the initial quantity per store to be distributed 1416.

Consideration of the minimum and/or maximum quantities set for a store 1405 occurs in a min/max step 1418. The initial quantity to be distributed to each store 1416 is compared to a minimum store quantity 1419 and a maximum store quantity 1420 (in FIG. 15, a minimum of 12 and no maximum) and a revised quantity per store to be distributed 1421 is determined. If the initial quantity per store to be distributed 1416 is less than the minimum store quantity 1419, then a min/max quantity per store to be distributed 1421 is the minimum quantity 1419. If the initial quantity per store to be distributed 1416 is more than the maximum store quantity 1420, then the min/max quantity per store to be distributed 1421 is the maximum quantity 1420. If the initial quantity per store to be distributed 1416 is less than the maximum quantity 1420 but more than the minimum quantity 1419, than the min/max quantity per store to be distributed 1421 is equal to the initial quantity per store to be distributed 1416.

If the sum of the min/max quantity per store to be distributed 1421 and the putaway quantity 1409 is greater than or less than the initial quantity to be distributed 1403, then a fix remaining quantity step 1425 is performed. As previously discussed, numerous scenarios may be used to reduce the quantities so that they match. For instance, FIG. 15 depicts a scenario 1427 where the remainder of negative two is assigned to be allocated to the two stores with the largest quantities 1428 to determine total quantity with remainders to be distributed 1429.

Figure 17:
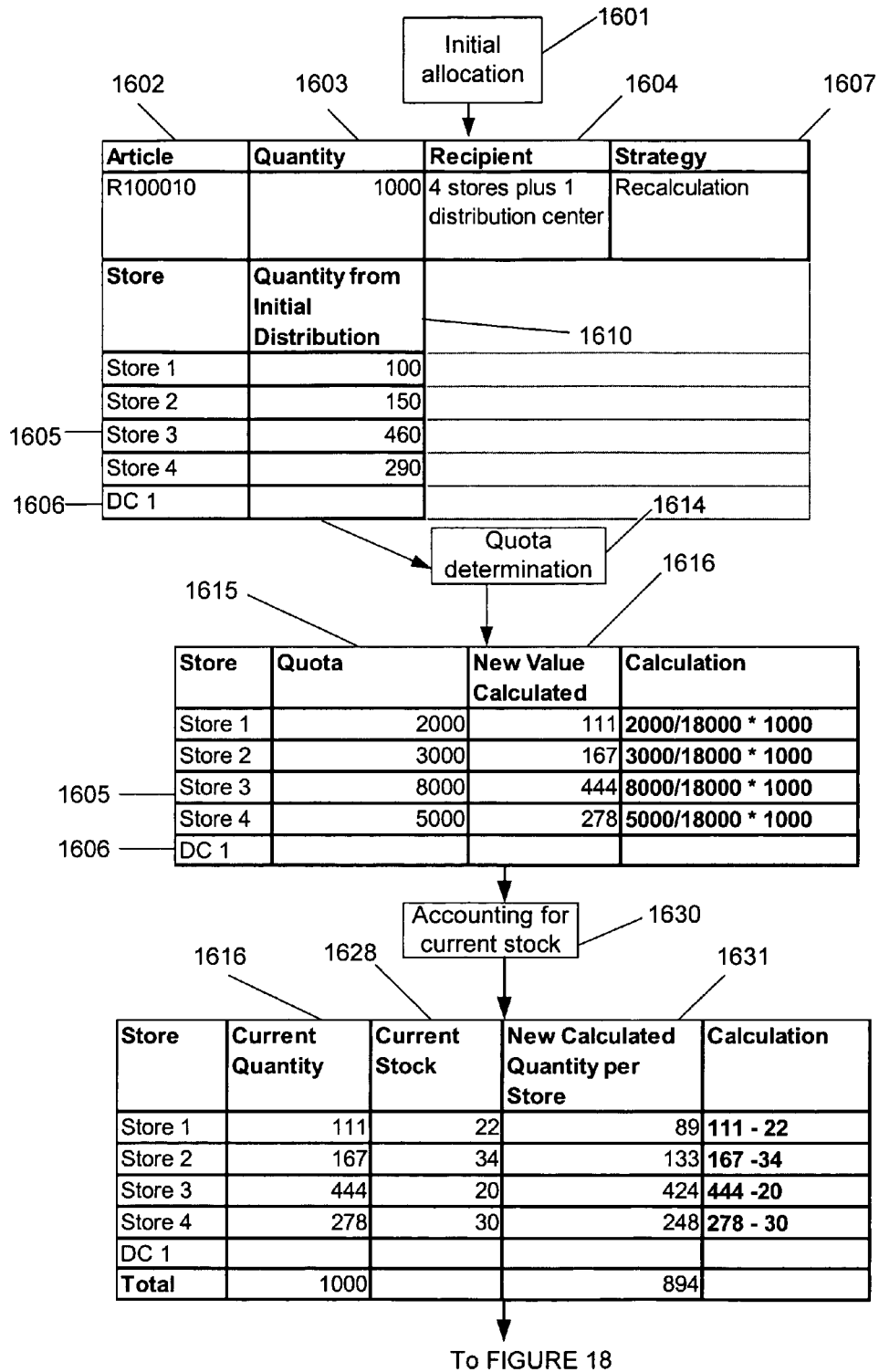
FIG. 17 illustrates an exemplary embodiment of a recalculation of the quantity of an article to be distributed to recipients.
Figure 18:
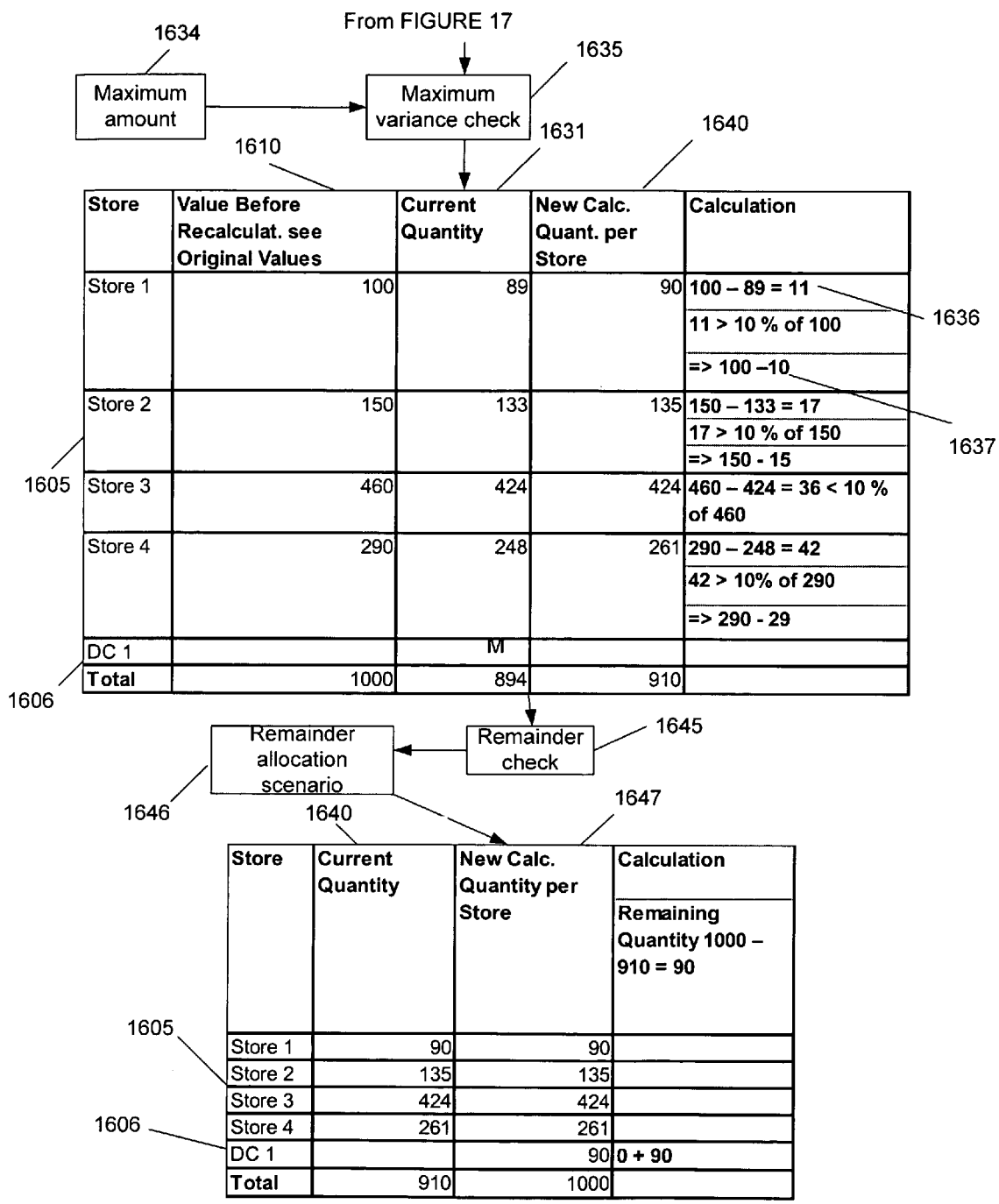
FIG. 18 illustrates a continuation of the process of FIG. 17.

Referring now to FIGS. 17 and 18, quantity 1603, recipients 1604 (both stores 1605 and distribution center 1606), and allocation strategy 1607, are provided for the article 1602 being allocated. For example, FIG. 17 depicts allocation of 1000 items of article R100010 to four stores and a distribution center in an initial allocation step 1601. A quantity from initial distribution 1629 is provided for each recipient 1604.

In a quota determination step 1614, the quota 1615 for each store 1605 with respect to the article 1602 is determined such as by querying the business intelligence warehouse. The quotas 1615 are summed and the quota for each store 1605 is determined as a percentage of the sum. A new value is calculated based upon the quotas by multiplying this percentage by the total quantity from initial distribution 1610 to arrive at the initial quantity per store to be distributed 1616.

The current store stock is accounted for in a step 1630. In the store stock accounting, the current stock quantity, as taken from the business intelligence warehouse, is subtracted from the initial quantity per store to be distributed 1616 to determine the stock-modified quantity per store to be distributed 1631.

With reference now to FIG. 18, a maximum variance check 1635 may be performed to determine if the change in a store's 1632 stock quantity (if the initial quantity per store to be distributed 1616 were actually delivered) will change more than a maximum amount 1634 (10 percent in FIG. 18). A calculation is performed to determine what percentage the stock-modified quantity per store to be distributed 1631 varies from the quantity from initial distribution 1610 for each recipient 1604, resulting in a calculated variance 1636 for each recipient 1604. The calculated variance 1636 is compared to the maximum variance 1637. If the calculated variance 1636 is less than or equal to the maximum variance 1637, then a variance-checked quantity per store to be distributed 1640 is equal to the stock-modified quantity per store to be distributed 1631 quantity. If the calculated variance 1636 is more than the maximum variance 1637, then the quantity from initial distribution is multiplied by the maximum variance 1637 to determine the variance-checked quantity per store to be distributed 1640.

A remainder checking step 1645 is performed. If the sum of the variance-checked quantity per store to be distributed 1640 for each store 1605 is less than the sum of the quantity from initial distribution 1629 for all stores 1605, then the remainder must be assigned to be allocated to a recipient 1604 according to a scenario 1646 to determine the final quantity per recipient to be distributed 1648. For example, in one embodiment shown in FIG. 18, the remainder 1647 is assigned to the distribution center 1606.

In general, there is no restriction on how allocation strategies can be used in the allocation table. The strategies need not be restricted to just recalculation or online usage. In one exemplary embodiment, the current accumulated stock for all articles of a theme module is recorded at the store level in the business intelligence warehouse. Key figures are stored for the different aggregation levels in the business intelligence warehouse.

As the sales/planned data are determined in the business intelligence warehouse at the assortment module level, for example, a function module will be required to determine the article hierarchy or theme structure of an article (the article from the allocation table item for which allocation is to be carried out). In one exemplary embodiment, an allocation strategy will be implemented per allocation table item. In other words, if the business intelligence warehouse is accessed per strategy, one query will be carried out per allocation table item in the business intelligence warehouse (per allocation table item).

In one exemplary embodiment, an allocation table has a post-allocation flag and date, along with a post-allocation strategy, and is referred to as a post-allocation table. When the time of a post-allocation table is reached or a shipment notification is received, then recalculation of the allocation table with the post-allocation strategy produces the post-allocation table. A check may be performed to determine the plausibility of the post-allocation strategies.

In one exemplary embodiment, the article list will be incorporated in the article possible entries help. This means that the article list can also be used for multiple selections when selecting the articles for which an analysis was carried out in the business intelligence warehouse using the allocation strategy. In one exemplary embodiment, a user can save and reuse selection screen variants as templates for the allocation strategies that provide different parameters on a selection screen. For example, in one embodiment, it is provided as a standard function of the selection screen that a user can store the current input data as a variant. In one embodiment, the present invention includes a mechanism for recording an error log. A log of the messages issued during implementation on the allocation screen may also be recorded. In one embodiment, an info and error log is available after an allocation strategy is executed.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures, and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some embodiments, the present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention, in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

It is important to note that the above-described preferred and alternative embodiments of the present invention are illustrative only. Although the invention has been described in conjunction with specific embodiments thereof, those skilled in the art will appreciate that numerous modifications are possible without materially departing from the novel teachings and advantages of the subject matter described herein. For example, although the allocation table is described as containing certain allocation table item data, it should be appreciated by one skilled in the art that any of the multitude of properties of a specific good or article could be included in the allocation table. Further, the format of the allocation table is not limited to those formats that are disclosed and the term allocation table is intended to broadly cover all formats to the extent the prior art allows. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A method for synchronizing an allocation table with a purchase order in a computerized system, comprising the steps of:

generating via one or more processors the allocation table based on determining that items have been previously divided up among certain stores in a certain proportion;

determining via one or more processors a business type for a store;

generating via one or more processors the purchase order for the store based on the allocation table and the business type in the computerized system, the purchase order having purchase order data relating to items to be purchased from a vendor;

the allocation table having allocation table data, wherein the allocation table is generated prior to submission of the purchase order to the vendor to purchase the items;

detecting via one or more processors a change in at least one of the purchase order data and the allocation table data;

automatically updating via one or more processors the purchase data to reflect the change in the allocation table;

automatically updating via one or more processors the allocation table data to reflect the change in the purchase data, unless at least one follow-on document regarding the items has been created;

and displaying an updated allocation table.

2. The method of claim 1, wherein a change to the allocation table which changes a number of stores relating to the allocation table will automatically change a purchase order quantity across all of the stores relating to the allocation table to redistribute the purchase order.

3. The method of claim 1, wherein generation of the allocation table occurs following the creating of an ad-hoc purchase order.

4. The method of claim 1, wherein generation of the allocation table is driven by an operational assortment planning and control system.

5. The method of claim 1, wherein the change is in the purchase order.

6. The method of claim 1, wherein the change is in the allocation table.

7. The method of claim 1, wherein the change is chosen from the group consisting of recipient quantity, delivery date, recipient, distribution center, and combinations thereof.

8. The method of claim 7, wherein the change is in a recipient quantity.

9. The method of claim 1, further comprising the step of checking if the allocation table can be changed by determining if the allocation table is currently in use; wherein the at least one follow-on document includes at least one of vendor order, third-party purchase order, stock transport order, sales order and delivery.

10. A system for synchronizing an allocation table with a purchase order, comprising:

a central processing unit (CPU); and a storage device coupled to the CPU and having information stored therein for configuring the CPU to:

generate via one or more processors the allocation table based on determining that items have been previously divided up among certain stores in a certain proportion;

determine via one or more processors a business type for a store;

generate via one or more processors the purchase order for the store based on the allocation table and the business type, the purchase order having purchase order data relating to items to be purchased from a vendor, wherein the allocation table is generated prior to submission of the purchase order to the vendor to purchase the items, detect via one or more processors a change in at least one of the purchase order data and the allocation table data, automatically update via one or more processors the purchase data to reflect the change in the allocation table; and automatically update via one or more processors the allocation table data to reflect the change in the purchase data, unless at least one follow-on document regarding the items has been created.

11. The system of claim 10, wherein a change to the allocation table which changes a number of stores relating to the allocation table will automatically change a purchase order quantity across all of the stores relating to the allocation table to redistribute the purchase order quantity.

12. The system of claim 10, wherein generation of the allocation table occurs following the creating of an ad-hoc purchase order.

13. The system of claim 10, wherein generation of the allocation table is driven by an operational assortment planning and control system.

14. The system of claim 10, wherein the change is in the purchase order.

15. The system of claim 10, wherein the change is in the allocation table.

16. The system of claim 10, wherein the change is chosen from the group consisting of recipient quantity, delivery date, recipient, distribution center, and combinations thereof.

17. The system of claim 16, wherein the change is in a recipient quantity.

18. The system of claim 10, wherein the storage device further include information stored therein for configuring the CPU to check if the allocation table can be changed by determining if the allocation table is currently in use; wherein the at least one follow-on document includes at least one of vendor order, third-party purchase order, stock transport order, sales order and delivery.

19. A program product for synchronizing an allocation table with a purchase order in a computerized system, the program product comprising machine readable program code for causing, when executed, one or more machines to perform the following method steps:

generating the allocation table based on determining that items have been previously divided up among certain stores in a certain proportion;

determining a business type for a store;

generating the purchase order for the store based on the allocation table and the business type, the purchase order having purchase order data relating to items to be purchased from a vendor;

wherein the allocation table is generated prior to submission of the purchase order to the vendor to purchase the items;

detecting a change in at least one of the purchase order data and the allocation table data;

automatically updating the purchase data to reflect the change in the allocation table, wherein changes to the purchase order include changing a quantity of items or a delivery date;

automatically updated the allocation table data to reflect the change in the purchase data, unless at least one follow-on document regarding the items has been created; wherein changes to the allocation table include changing a quantity of items or a delivery date; and displaying an updated allocation table.

20. The program product of claim 19, wherein a change to the allocation table which changes a number of stores relating to the allocation table will automatically change a purchase order quantity across all of the stores relating to the allocation table to redistribute the purchase order.

21. The program product of claim 19, wherein generation of the allocation table occurs following the creating of an ad-hoc purchase order.

22. The program product of claim 19, wherein generation of the allocation table is driven by an operational assortment planning and control system.

23. The program product of claim 19, wherein the change is in the purchase order.

24. The program product of claim 19, wherein the change is in the allocation table.

25. The program product of claim 19, wherein the change is chosen from the group consisting of recipient quantity, delivery date, recipient, distribution center, and combinations thereof.

26. The program product of claim 25, wherein the change is in a recipient quantity.

27. The program product of claim 19, further comprising the step of checking if the allocation table can be changed by determining if the allocation table is currently in use; wherein the at least one follow-on document includes at least one of vendor order, third-party purchase order, stock transport order, sales order and delivery.

* * * * *